United States Patent
Ima et al.

(10) Patent No.: US 7,562,753 B2
(45) Date of Patent: Jul. 21, 2009

(54) TRANSAXLE OF MULTI-WHEEL DRIVE VEHICLE

(75) Inventors: Akihiro Ima, Hyogo (JP); Toshiyuki Hasegawa, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 468 days.

(21) Appl. No.: 11/202,220

(22) Filed: Aug. 12, 2005

(65) Prior Publication Data
US 2006/0032692 A1  Feb. 16, 2006

(30) Foreign Application Priority Data

Aug. 12, 2004 (JP) ............................. 2004-234968
Sep. 24, 2004 (JP) ............................. 2004-277337

(51) Int. Cl.
*B60K 17/34* (2006.01)
*F16D 11/16* (2006.01)
*F16D 21/02* (2006.01)

(52) U.S. Cl. ...................... 192/35; 192/48.8; 192/55.1; 192/93 C; 192/103 R

(58) Field of Classification Search ............... 192/48.4, 192/49, 93 C; 180/246
See application file for complete search history.

(56) References Cited

U.S. PATENT DOCUMENTS

| | | | | |
|---|---|---|---|---|
| 2,850,920 | A | * | 9/1958 | Petsch .......................... 180/248 |
| 4,643,284 | A | | 2/1987 | Hardt et al. |
| 5,203,232 | A | * | 4/1993 | Ito et al. ........................ 74/650 |
| 5,540,119 | A | * | 7/1996 | Hudson ........................ 74/650 |
| 6,186,258 | B1 | | 2/2001 | Deutschel et al. |
| 6,383,109 | B1 | | 5/2002 | Hofer |

FOREIGN PATENT DOCUMENTS

| | | |
|---|---|---|
| EP | 0818341 | 1/1998 |
| JP | SHO 61-27318 | 2/1986 |
| JP | 2002-59754 | 2/2002 |

OTHER PUBLICATIONS

International Search Report for International Appl. No.: 05017482.0 - 2422; European Patent Office, mailed on Apr. 25, 2006.

* cited by examiner

*Primary Examiner*—Rodney H Bonck
(74) *Attorney, Agent, or Firm*—Sterne, Kessler, Goldstein & Fox P.L.L.C.

(57) ABSTRACT

A transaxle for auxiliary wheels of a vehicle having a main drive wheel and left and right auxiliary drive wheels, comprises: a gear to which a rotary force for driving the main drive wheel is distributed; a pair of left and right axles drivingly connected to the respective left and right auxiliary drive wheels; a pair of clutches, wherein one of the clutches is interposed between the gear and the left axle, and the other clutch is interposed between the gear and the right axle; judging means for judging whether or not the main drive wheel slips; and a shift mechanism for engaging and disengaging the pair of clutches based on the judgment of the judging means. The judging means comprises a two-way clutch interposed between the gear and the pair of axles, which is engaged when rotary speed of the gear exceeds rotary speed of at least one of the axles. Alternatively, the judging means comprises: a sensor for detecting rotary speed of the gear; a sensor for detecting rotary speed of at least one of the axles; and a controller for controlling the shift mechanism. The controller receives signals from both of the sensors so as to judge whether or not the main drive wheel slips.

18 Claims, 11 Drawing Sheets

TRANSAXLE OF MULTI-WHEEL DRIVE VEHICLE

BACKGROUND OF THE INVENTION

1. Field of the Invention

The present invention relates to a transaxle for auxiliary drive wheels of a multi-wheel drive vehicle having main drive wheels and auxiliary drive wheels, wherein an auxiliary transaxle for driving the auxiliary drive wheels is automatically selectively put into either a drive-on mode for driving the auxiliary drive wheels by power transmitted from a main transaxle for main drive wheels or a drive-off mode for isolating the auxiliary drive wheels from the power transmitted from the transaxle for main drive wheels.

2. Related Art

Conventionally, as disclosed in Japanese Laid Open Gazette No. 2002-59754, there is a well-known six-wheel drive utility vehicle as an example of multi-wheel drive vehicles. The six drive wheels of the vehicle are left and right rear main drive wheels, left and right middle main drive wheels, and left and right front auxiliary drive wheels. The vehicle is equipped with a first transaxle for the rear main drive wheels, a second transaxle for the middle main drive wheels, and an auxiliary transaxle for the front auxiliary drive wheels. The front auxiliary drive wheels are steerable. The vehicle also comprises a transmission such as a CVT (continuously variable transmission) for transmitting power from a prime mover to the first transaxle.

The first transaxle is provided with a PTO casing through which the power of the prime mover is distributed between the second transaxle and the auxiliary transaxle. A PTO shaft extended from the PTO casing is drivingly connected to the auxiliary transaxle via a propeller shaft, universal joints and a clutch. The clutch is optionally manipulated so that the clutch is selectively engaged for driving the auxiliary drive wheels by the power transmitted from the PTO casing, i.e., for driving all of the six wheels, or disengaged for isolating the auxiliary drive wheels from the power transmitted from the PTO casing, i.e., for driving only the four main drive wheels.

The problem of the vehicle is to require an operator's troublesome manipulation. If the manipulation is mistaken or wrong, the vehicle may unexpectedly travel by the six-wheel drive, thereby causing waste energy consumption, or causing heavy steering operation.

Then, as disclosed in Japanese Laid-Open Gazette No. Sho 61-27318, there is a well-known conventional transaxle. If this transaxle serves as the auxiliary transaxle of the above vehicle, an operator does not have to manipulate the clutch. The transaxle has a clutch system, which is normally clutched off for driving a vehicle by the driving force of only main drive wheels, and automatically clutched on for driving auxiliary drive wheels in addition to the main drive wheels only when the main drive wheel slips.

In this regard, the transaxle supporting left and right auxiliary drive wheels has a drive shaft interlocking with main drive wheels of a vehicle, and has a pair of left and right two-way clutches, each of which is interposed between the drive shaft and a shaft interlocking with each of the left and right auxiliary drive wheels. Each of the two-way clutches comprises concentric inner and outer rings. The inner ring receives rotary force from the drive shaft driven synchronously to the main drive wheels, and the outer ring receives rotary force from the auxiliary drive wheel. The two-way clutch further comprises a cage holding rollers, which is interposed between the inner and outer rings. The cage is constantly frictionally resisted so as to delay the rotation of the inner ring after the rotation of the outer ring, whereby the outer ring normally rotates together with the auxiliary drive wheel freely from the rotation force of the inner ring. If the main drive wheel slips so as to reduce the rotary speed of the auxiliary drive wheels, the clutches are engaged so as to transmit the rotary force of the inner rings to the outer rings, thereby driving the auxiliary drive wheels by the rotary force from the main drive wheels side. Whether the vehicle travels forward or backward, the effect is obtained due to the two-way clutches.

However, if load on the auxiliary drive wheel is large during the slip of the main drive wheel, the rollers may be firmly engaged between the inner and outer rings so that they cannot separate the inner and outer rings from each other after the main drive wheel escapes from slipping. If the problem happens, the vehicle has to travel with unexpected drive of the auxiliary drive wheels, thereby reducing driving efficiency and steering capacity.

SUMMARY OF THE INVENTION

An object of the present invention is to provide a transaxle supporting left and right axles drivingly connected respective left and right auxiliary drive wheels to be adapted to a vehicle having a main drive wheel and the left and right auxiliary drive wheels so that the vehicle usually travels by driving only the main drive wheel, and the auxiliary drive wheels are driven when the main drive wheel slips, wherein, even if high load is applied on the auxiliary drive wheel, the axles which have received rotary force driving the main drive wheel so as to drive the respective auxiliary drive wheels can smoothly return to be free from the rotary force driving the main drive wheel when the main drive wheel escapes from slipping.

To achieve the object, according to the present invention, a transaxle for auxiliary drive wheels of a vehicle having a main drive wheel and left and right auxiliary drive wheels, comprising: a gear to which a rotary force for driving the main drive wheel is distributed; a pair of left and right axles drivingly connected to the respective left and right auxiliary drive wheels; a pair of clutches, wherein one of the clutches is interposed between the gear and the left axle, and the other clutch is interposed between the gear and the right axle; judging means for judging whether or not the main drive wheel slips; and a shift mechanism for engaging and disengaging the pair of clutches. The shift mechanism engages the pair of clutches when the judging means judges that the main drive wheel slips, and the shift mechanism disengages the pair of clutches when the judging means judges that the main drive wheel does not slip.

Therefore, whether or not the auxiliary drive wheels are driven depends upon the pair of clutches operated by the shift mechanism. The pair of clutches can have a reliable structure to be smoothly disengaged for shutting off the rotary force of the gear from the pair of axles when the main drive wheel escapes slipping.

Preferably, the pair of clutches comprise: a cylindrical shaft disposed around the pair of axles so as to be rotatable integrally with the gear; respective balls radially movably disposed through the cylindrical shaft, wherein the pair of axles are formed on outer peripheral surfaces thereof with respective recesses into which the respective balls can be engaged; and respective pressure members disposed on an outer peripheral surface of the cylindrical shaft so as to be shifted between a state of pressing the respective balls into the respective recesses through the cylindrical shaft and a state of allowing the respective balls to be removed from the respective recesses through the cylindrical shaft.

Therefore, this structure can be provided as the above-mentioned reliable structure of the pair of clutches.

Preferably, the transaxle further comprises a housing incorporating the gear, the pair of axles, and the pair of clutches. The shift mechanism comprises: a push-and-pull type actuator for shifting the pair of clutches; and an operation member engaging with the pair of clutches. The push-and-pull type actuator is fixed to the housing so as to have a movable portion abutting against the operation member.

Therefore, the actuator, which simply abuts against the operation member and is not rigidly connected to the operation member, facilitates its assembly with the operation member and disassembly from the operation member, thereby reducing manufacturing costs of the transaxle.

Preferably, a first aspect of the judging means compares rotary speed of at least one of the axles with rotary speed of the gear. The judging means judges that the main drive wheel slips when rotary speed of the gear exceeds rotary speed of the at least one of the axles. The judging means judges that the main drive wheel does not slip unless rotary speed of the main drive wheel exceeds rotary speed of the at least one of the axles.

Therefore, a two-way clutch, which is engaged while peripheral speed of the main drive wheel exceeds peripheral speeds of the auxiliary drive wheels, and which is disengaged when peripheral speed of at least one of the auxiliary drive wheels exceeds peripheral speed of the main drive wheel, can serve as the judging means.

Preferably, in association with the first aspect of the judging means, a gear ratio for driving the gear is set so that, while the pair of clutches are engaged, peripheral speed of the main drive wheel exceeds peripheral speeds of the auxiliary drive wheels.

Therefore, unexpected engaging of the pair of clutches during turning of the vehicle can be prevented unless the main drive wheel slips.

Preferably, the first aspect of the judging means is a two-way clutch interposed between the gear and the pair of axles. When rotary speed of the gear exceeds rotary speed of at least one of the pair of axles, the two-way clutch is engaged, and the shift mechanism engages the pair of clutches by the engaging of the two-way clutch. While rotary speed of the gear is smaller than rotary speeds of the pair of axles, the two-way clutch is disengaged, and the shift mechanism disengages the pair of clutches by the disengaging of the two-way clutch.

Therefore, the two-way clutch can be simple and inexpensive because the two-way clutch is required only for comparing rotary speed of the pair of axles with rotary speed of the gear, i.e., for detecting whether or not the main drive wheel slips.

Preferably, a torque limiter is interposed between the two-way clutch and the pair of axles, or between the gear and the two-way clutch.

Therefore, the torque limiter reduces torque of the pair of axles to be transmitted to the two-way clutch, or torque of the gear to be transmitted to the two-way clutch, whereby the two-way clutch required only for detecting whether or not the main drive wheel slips can be minimized and increase its durability.

Preferably, the shift mechanism comprises: a switch sensing either engaging or disengaging of the two-way clutch; and an actuator for shifting the pair of clutches. The actuator is controlled according to a state of the switch.

Due to such a simple structure, the shift mechanism can be operatively connected to the pair of clutches.

Alternatively, preferably, a second aspect of the judging means compares rotary speed ratio of the gear to at least one of the axles with a threshold, wherein the judging means judges that the main drive wheel slips when the rotary speed ratio is lower than the threshold, and wherein the judging means judges that the main drive wheel does not slip unless the rotary speed ratio is lower than the threshold.

Further preferably, the shift mechanism comprises an actuator for engaging and disengaging the pair of clutches, and the second aspect of the judging means comprises: a gear speed sensor for detecting rotary speed of the gear; an axle speed sensor for detecting rotary speed of one of axles; and a controller for receiving signals from both of the sensors and for controlling the actuator.

Further preferably, the controller compares a rotary speed ratio of the gear to the one of the axles with a threshold. The controller controls the actuator so as to engage the pair of clutches when the rotary speed ratio is lower than the threshold. The controller controls the actuator so as to disengage the pair of clutches unless the rotary speed ratio is lower than the threshold.

Therefore, the sensor and the actuator are used so as to detect whether or not the main drive wheel slips, thereby requiring no mechanical detecting system such as a two-way clutch. The transaxle, which does not have to incorporate such a mechanical detecting system, can be compacted.

Alternatively, preferably, a third aspect of the judging means compares a rotary speed ratio of the gear to an average rotary speed of the axles with a threshold, wherein the judging means judges that the main drive wheel slips when the rotary speed ratio is lower than the threshold, and wherein the judging means judges that the main drive wheel does not slip unless the rotary speed ratio is lower than the threshold.

Further preferably, the shift mechanism comprises an actuator for engaging and disengaging the pair of clutches. The third aspect of the judging means comprises: a gear speed sensor for detecting rotary speed of the gear; first and second axle speed sensors for detecting respective rotary speeds of the axles; and a controller for receiving signals from the three sensors and for controlling the actuator.

Further preferably, the controller compares a rotary speed ratio of the gear to an average rotary speed of the axles with a threshold. The controller controls the actuator so as to engage the pair of clutches when the rotary speed ratio is lower than the threshold. The controller controls the actuator so as to disengage the pair of clutches unless the rotary speed ratio is lower than the threshold.

Therefore, the means, which uses the sensor and the actuator so as to detect whether or not the main drive wheel slips, requires no mechanical detecting system such as a two-way clutch. The transaxle, which does not have to incorporate such a mechanical detecting system, can be compacted. Further, the third aspect of the judging means takes the differential rotation of the left and right axles into account, thereby improving property thereof especially during turning of the vehicle.

These, further and other objects, features and advantages will appear more fully from the following description with reference to accompanying drawings.

DETAILED DESCRIPTION OF THE INVENTION

Figure 1:
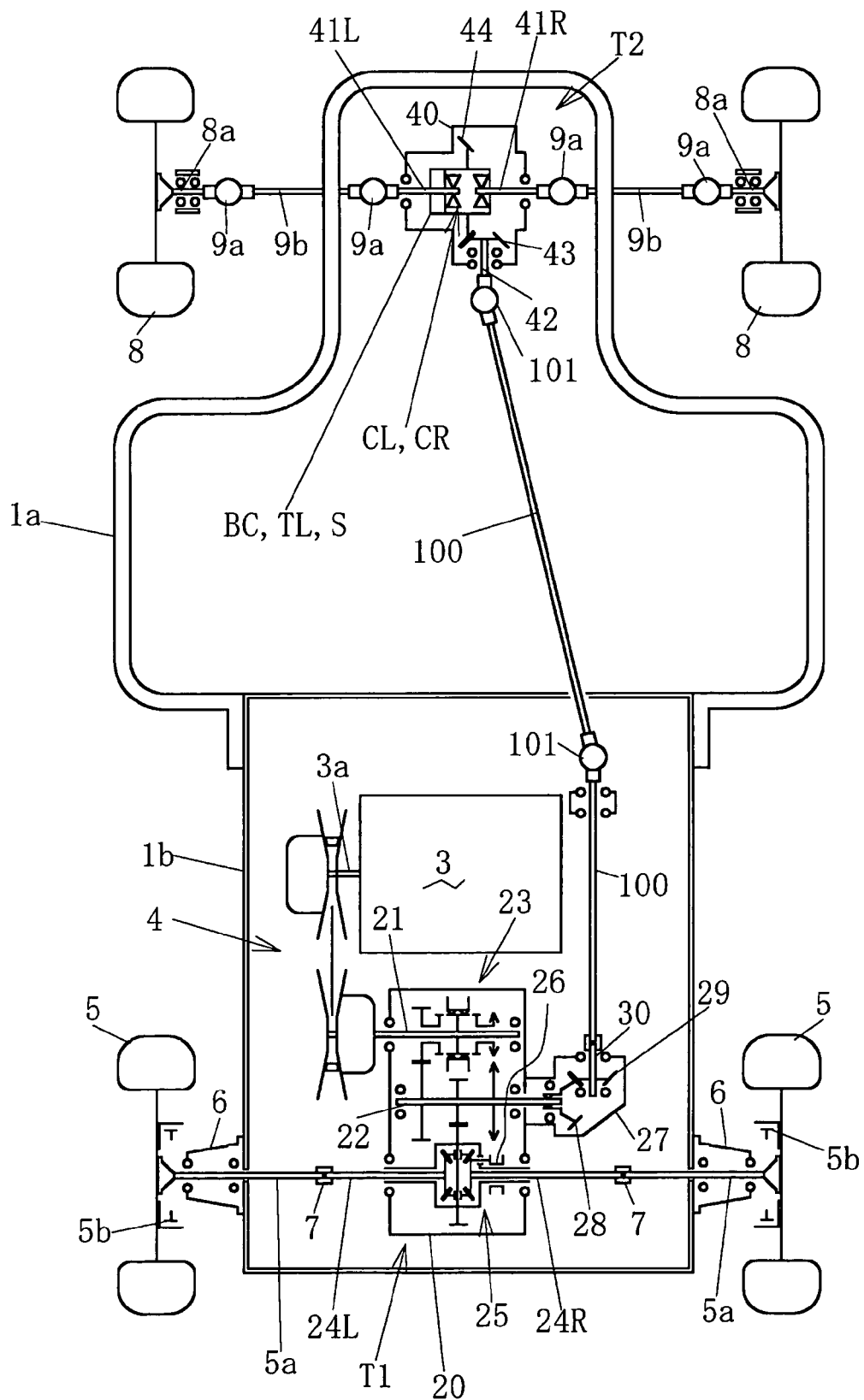
FIG. 1 is a schematic plan view of a four-wheel drive utility vehicle equipped with a main transaxle and an auxiliary transaxle according to the present invention.
Figure 2:
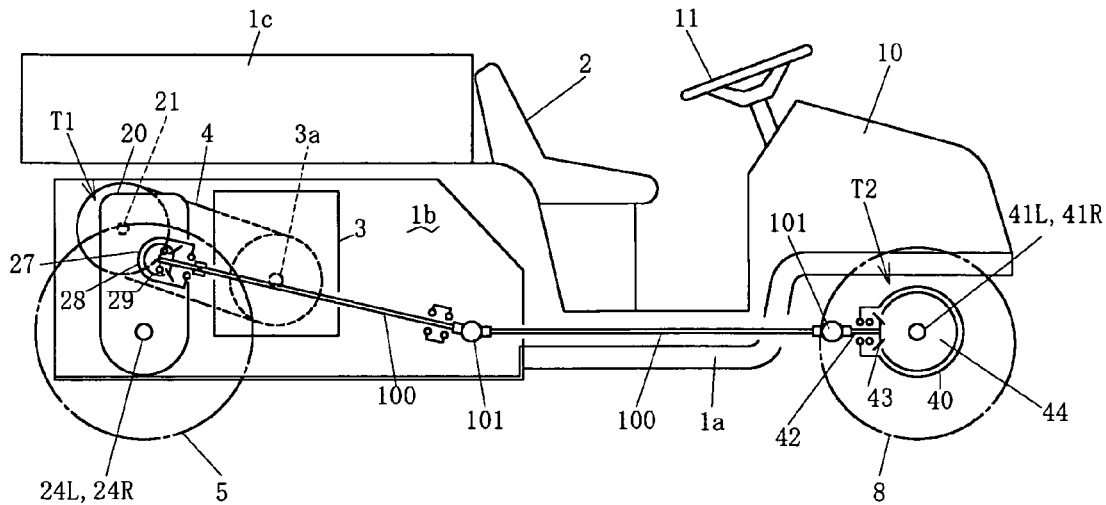
FIG. 2 is a schematic side view of the utility vehicle.

Referring to FIGS. 1 and 2, description will be given of a four-wheel drive utility vehicle having a pair of left and right main (rear) drive wheels 5 and a pair of auxiliary (front) drive wheels 8, serving as an example of multi-wheel drive vehicle according to the present invention. Alternatively, the vehicle may be provided with an additional pair of main drive wheels (such as middle drive wheels) so as to be made into a six-wheel drive vehicle.

The vehicle has a vehicle body including a front frame 1a and a rear frame 1b integrally connected to each other. Rear frame 1b includes a footboard, which is substantially rectangular in plan view, is spread over rear frame 1b, and vertical side plates erected from front, rear, left and right side ends of the footboard. A cargo deck 1c is supported above rear frame 1b.

An engine 3 having a lateral crankshaft is disposed in rear frame 1b. In this embodiment, engine 3 has a leftwardly projecting output shaft 3a. A main transaxle T1 is disposed behind engine 3. Main transaxle T1 has an input shaft 21 projecting leftward in parallel to output shaft 3a of engine 3. A belt type transmission 4, which may be a CVT (continuously variable transmission), is drivingly interposed between output shaft 3a and input shaft 21.

Main transaxle T1 supports left and right axles 24L and 24R projecting laterally opposite to each other. Left and right rear main drive wheels 5 are disposed on lateral outside of the left and right side plates of rear frame 1b. Bearing members 6 are attached onto outer surfaces of the left and right side plates of rear frame 1b. Each main drive wheel 5 has a wheel axis shaft 5a penetrating each of bearing members 6 so as to be disposed coaxially to each of axles 24L and 24R, and a coupling 7 is spline-fitted onto an inner end of wheel axis shaft 5a and an outer end of each of axles 24L and 24R in rear frame 1b so as to integrally rotatably connect each wheel axis shaft 5a to each of axles 24L and 24R. A brake 5b is disposed in a rim of each of main drive wheels 5.

A front portion of front frame 1a is higher than a rear portion of front frame 1a. An auxiliary transaxle T2 is disposed at a substantially lateral middle position below the front portion of front frame 1a. Auxiliary transaxle T2 supports left and right axles 41L and 41R projecting laterally opposite to each other. Each of left and right front auxiliary drive wheels 8 are steerably disposed on lateral outside of the front portion of front frame 1a coaxially to each of axles 41L and 41R, and drivingly connected to each of axles 41L and 41R via universal joints 9a and a propeller shaft 9b. The front portion of front frame 1a is covered with a front cover 10 having a rear upper portion serving as an instrument panel, above which a steering wheel 11 is disposed. A typical suspension device, such as a coiled spring or a shock absorber, is interposed between each of left and right side ends of front frame 1a and each of auxiliary drive wheels 8 so that auxiliary drive wheels 8 are suspended from front frame 1a independently of each other.

An interior structure of main transaxle T1 will be described with reference to FIGS. 1 and 2. Main transaxle T1 includes a housing 20 whose bottom portion is fastened to the footboard of rear frame 1b by bolts so as to be fixedly disposed substantially upright adjacent to engine 3 in the vehicle. In this regard, in housing 20, input shaft 21, coaxial axles 24L and 24R, and a counter shaft 22 are disposed laterally in parallel so that counter shaft 22 is disposed above axles 24L and 24R and below input shaft 21.

A reversing gear mechanism 23 is interposed between input shaft 21 and counter shaft 22 in housing 20 so as to decide one of opposite rotary directions of counter shaft 22. The rotary force of counter shaft 22 is transmitted to a final gear of a differential gear unit 25 differentially connecting axles 24L and 24R to each other. Differential gear unit 25 is provided with a typical differential locking mechanism 26.

Main transaxle T1 takes off power from counter shaft 22 on the laterally opposite side to belt type transmission 4 so as to transmit the power to auxiliary transaxle T2. In other words, the output force of counter shaft 22 is distributed between differential gear unit 25 for driving axles 24L and 24R and auxiliary transaxle T2 for driving axles 41L and 41R.

In this regard, a PTO casing 27 is attached onto the right side surface of housing 20 (laterally opposite to belt type transmission 4) so as to contain an utmost end of counter shaft 22 projecting outward from housing 20. In PTO casing 27, an input bevel gear 28 is fixed on the utmost end of counter shaft 22, an output shaft 30 is journalled in perpendicular to counter shaft 22, and an output bevel gear 29 is fixed on output shaft 30 so as to mesh with input bevel gear 28. Output shaft 30 projects outward from PTO casing 27 toward auxiliary transaxle T2.

An interior structure of auxiliary transaxle T2 according to a first embodiment will be described with reference to FIG. 3. Auxiliary transaxle T2 includes a housing 40 supporting left and right axles 41L and 41R and an input shaft 42. Axles 41L and 41R are extended laterally outward from respective left and right side ends of housing 40. Input shaft 42 is disposed in perpendicular to axles 41L and 41R, and projects outward (rearward) from housing 40 to be drivingly connected to output shaft 30 via a propeller shaft 100 and universal joints 101 so as to receive the rotary force from main transaxle T1 synchronized to the rotation of main drive wheels 5.

In housing 40, a bevel pinion 43 is formed on an (front) end of input shaft 42, and meshes with a bevel center gear 44 coaxially and relatively rotatably fitted around axles 41L and 41R.

A gear ratio of center gear 44 to bevel pinion 43 is set so that, while clutches CL and CR are engaged, total peripheral speeds of main drive wheels 5 become 110-120 percent of total peripheral speeds of auxiliary drive wheels 8. Therefore, both clutches CL and CR (especially, one for auxiliary drive wheel 8 on the inside of the turning vehicle) are prevented from being unexpectedly engaged during either straight travel or turning of the vehicle in a two-wheel drive mode by driving only unslipping main drive wheels 5.

Housing 40 is dividable into four housing elements, i.e., a first housing element 40a, a second housing element 40b, a third housing element 40c and a fourth housing element 40d. Three housing elements 40a, 40b and 40c are separably joined to one another in the axial direction of axles 41L and 41R. Fourth housing element 40d is joined to a rear surface of first housing element 40a so as to be separable from first housing element 40a in perpendicular to axles 41L and 41R. First housing element 40a serves as one of left and right side walls (in this embodiment, a right side wall) of housing 40, and third housing element 40c serves as the other right or left side wall (in this embodiment, a left side wall) of housing 40.

A bearing 48 is supported between first and fourth housing elements 40a and 40d, and a bearing 49 is supported in fourth housing element 40d, so that input shaft 42 is journalled by bearings 48 and 49 in first and fourth housing elements 40a and 40d. Center gear 44 is journalled at one end thereof by first housing element 40a via a bearing 50, and at the other end thereof by second housing element 40b via a bearing 51, so as to mesh with bevel pinion 43 in first housing element 40a.

Center gear 44 includes a first support element 45, a second support element 46 and a rig gear element 47. Bearing 50 is disposed on first support element 45, and bearing 51 is disposed on second support element 46. First support element 45 has a stepped portion, to which ring gear element 47 is fitted. Elements 45, 46 and 47 are aligned along the rotary axis of axles 41L and 41R and joined together by common bolts 99 so as to constitute center gear 44.

First support element 45 is integrally formed with a cylindrical shaft 45a extended through second support element 46 toward third housing element 40c. Proximal end portions of axles 41L and 41R are relatively rotatably supported in cylindrical shaft 45a of first support element 45 so as to face each other. Clutch CL is interposed between cylindrical shaft 45a and axle 41L, and clutch CR is interposed between cylindrical shaft 45a and axle 41R.

Axle 41L is formed with a plurality of recesses 52L aligned on the outer periphery thereof facing the inner peripheral surface of cylindrical shaft 45a, and axle 41R is formed with a plurality of recesses 52R aligned on the periphery thereof facing the inner peripheral surface of cylindrical shaft 45a. Cylindrical shaft 45a is formed with penetrating radial holes 53L corresponding to respective recesses 52L, and with penetrating radial holes 53R corresponding to respective recesses 52R. A ball 54L is disposed between each recess 52L and corresponding hole 53L so as to be movable in the radial direction of axle 41L. A ball 54R is disposed between each recess 52R and corresponding hole 53R so as to be movable in the radial direction of axle 41R.

A clutch slider 55 is axially movably disposed between an inner peripheral surface of second support element 46 and an outer peripheral surface of cylindrical shaft 45a. Clutch slider 55 is selectively shifted between a clutch-on position and a clutch-off position. Pressure members 56L and 56R are held in clutch slider 55 so as to axially slidably fitted on the outer peripheral surface of cylindrical shaft 45a. Springs 57L and 57R are interposed between clutch slider 50 and respective pressure members 56L and 56R so as to elastically press respective pressure members 56L and 56R against respective balls 54L and 54R.

Figure 3:
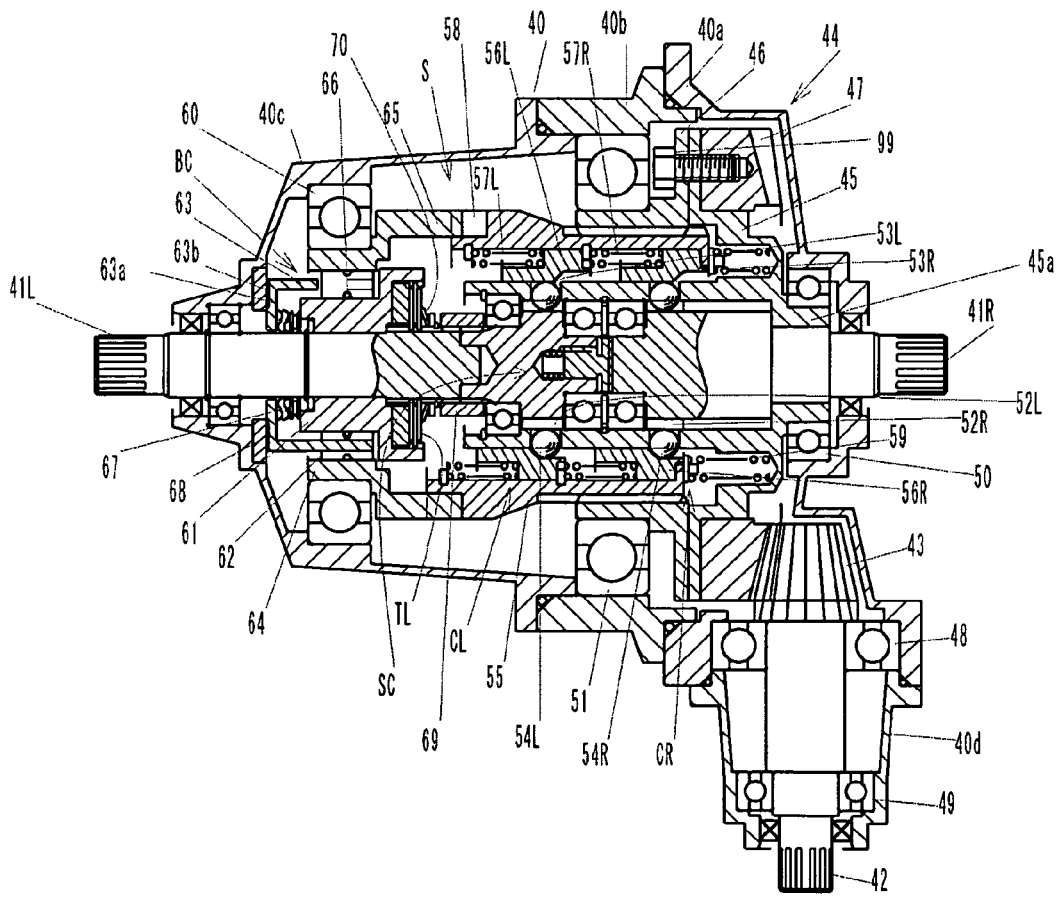
FIG. 3 is a sectional plan view of an auxiliary transaxle according to a first embodiment of the present invention.

In FIG. 3, clutch slider 55 is illustrated so that a portion thereof above axles 41L and 41R is disposed at the clutch-on position, and a portion thereof below axles 41L and 41R is disposed at the clutch-off position, for convenience. When clutch slider 55 is disposed at the clutch-on position, pressure members 56L and 56R press respective balls 54L and 54R into respective recesses 52L and 52R through respective penetrating holes 53L and 53R, thereby engaging clutches CL and CR for transmitting the rotary force of center gear 44 to axles 41L and 41R. When clutch slider 55 is disposed at the clutch-off position, due to shapes of pressure members 56L and 56R and the centrifugal force by the rotation of cylindrical shaft 45a of center gear 44, balls 54L and 54R are allowed to project radially outward from respective holes 53L and 53R so as to be removed from respective recesses 52L and 52R, thereby disengaging clutches CL and CR for isolating axles 41L and 41R from the rotary force of center gear 44.

On one end portion of clutch slider 55 toward third housing element 40c is formed a cam 58 shaped to alternately align substantially triangular convexes and concaves along the periphery thereof. A spring 59 is interposed between the other end portion of clutch slider 55 and first housing element 40a so as to constantly bias clutch slider 55 to the third housing element 40c side. The outer peripheral surface of clutch slider 55 is spline-fitted to the inner peripheral surface of second support element 45 so that clutch slider 55 is rotatable integrally with center gear 44 and axially slidable relative to center gear 44.

Axle 41L is disposed in third housing element 40c so as to be journalled by a bearing 60 via a two-way clutch BC. Two-way clutch BC comprises an inner ring 61, cylindrical rollers 62, a cage 63, an outer ring 64, and a spring 66.

Inner ring 61, cage 63 and outer ring 64 are concentrated centered on the axis of axle 41L. Inner ring 61 is freely rotatably provided on axle 41L. Outer ring 64 is rotatably held by bearing 60. Cage 63 is formed with roller-holding portions between inner ring 61 and outer ring 64 so as to hold respective rollers 62 between inner ring 61 and outer ring 64. Cage 63 is also formed with a vertical side plate portion 63a facing a (left) side wall portion of third housing element 40c. The roller-holding portions of cage 63 are extended from the space between inner ring 61 and outer ring 64, and connected to an outer peripheral edge of side plate portion 63a. A waved washer 67 and a thrust bearing are interposed between an inside surface of side plate portion 63a and inner ring 61 around axle 41L. A friction plate 63b is fitted onto an outside surface of side plate portion 63a (opposite to the inside surface thereof), and pressed against a retaining plate 68 held by the side wall of third housing element 40c so as to applying a certain braking force to cage 63.

Action of two-way clutch BC will be described with reference to FIGS. 4(a), 4(b) and 4(c). In the axial view of two-way clutch BC, the outer peripheral surface of inner ring 61 is strictly circular, and outer ring 64 is shaped to have cam portions and roller-receptacle portions 64a for receiving respective rollers 62 alternately aligned on the inner periphery thereof. Each of the cam portions has two cam surfaces 64b, which are symmetric in the peripheral direction of axle 41L. In other words, each roller-receptacle portion 64a has symmetric cam surfaces 64b at opposite ends thereof in the peripheral direction of axle 41L.

FIG. 4(a) illustrates a state of two-way clutch BC when the vehicle is stationary. Rollers 62 pressed by spring 66 are disposed at the deepest positions of respective roller-receptacle portions 64a.

FIG. 4(b) illustrates a state of two-way clutch BC when the vehicle travels forward. Cage 63 receives the above-mentioned braking force. Inner and outer rings 61 and 64 rotate in the arrowed direction, so that each roller 62 comes to abut against one of cam surfaces 64b at the opposite ends of each roller-receptacle portion 64a. Due to the above-mentioned gear ratio setting of mutually meshing bevel pinion 43 and center gear 44, or due to another matter, rotary speed of inner ring 61 becomes 110-120 percent of rotary speed of outer ring 64 constantly, i.e., during straight travel of the unslipping vehicle. Therefore, each roller 62 abutting against cam surface 64b is prevented from being wedged between cam surface 64b and inner ring 61. However, if the vehicle is slowed down by slipping of main drive wheel 5 so as to reduce the peripheral speed of auxiliary drive wheels 8, the rotary speed of outer ring 64 becomes larger than that of inner ring 61 so that each roller 62 abutting against cam surface 64b is wedged between cam surface 64b and inner ring 61, thereby engaging inner ring 61 with outer ring 64.

FIG. 4(c) illustrates a state of two-way clutch BC when the vehicle travels backward. The only different thing is that the rotational direction of inner and outer rings 61 and 64 rotate in the opposite direction so that each ring 62 abuts against the other of cam surfaces 64b at the opposite ends of each roller-receptacle portion 64a. Description of two-way clutch BC in this state is omitted because it acts in the same way as that in the state of FIG. 4(b).

Outer ring 64 of two-way clutch BC is integrally formed with a cam 65 extended toward clutch slider 55 so as to be adapted to engage with cam 58 of clutch slider 55, thereby constituting a shift mechanism S for shifting clutches CL and CR. If the rotary speed of outer ring 64 exceeds the rotary speed of inner ring 61 so as to engage inner ring 61 with outer ring 64, outer ring 64 receiving load on axle 41L through rollers 62 comes to rotate relative to clutch slider 55 driven together with center gear 44, thereby generating a thrust between cams 65 and 58.

Consequently, due to the thrust between cams 65 and 58, clutch slider 55 disposed at the clutch-off position (as the lower portion of clutch slider 55 below axles 41L and 41R illustrated in FIG. 3) automatically shifts (rightward in FIG. 3) to the clutch-on position (as the upper portion of clutch slider 55 above axles 41L and 41R illustrated in FIG. 3), thereby substantially simultaneously engaging clutches CL and CR for transmitting the rotary force of center gear 44 to axles 41L and 41R. In this state, even if main drive wheel 5 slips, auxiliary drive wheels 8 are driven so as to prevent the traveling vehicle from unexpectedly stopping. Further, even if axles 41L and 41R is highly loaded, torque is hardly enclosed in ball-type clutches CL and CR, so that, when main drive wheel 5 escapes from slipping, clutches CL and CR are quickly disengaged by the relatively light operational force of spring 59.

Additionally, a problem of auxiliary transaxle T2 is that, if auxiliary drive wheel 8 attached on axle 41L fitted to inner ring 61 floats above the ground during the slipping of main drive wheel 5, the thrust is not generated between cams 58 and 65 while cam 58 of clutch slider 55 transmits a rotary force to cam 65 of outer ring 64. To solve the problem, a spring-load type slip clutch SC is interposed between axles 41L and 41R so as to have a small friction force for constantly engaging axles 41L and 41R with each other. In this embodiment, a piston is not-relatively rotatably but axially slidably fitted in a hole formed in the proximal end portion of one of axles 41L and 41R, and projects therefrom while being biased by a spring toward the proximal end surface of the other axle 41R or 41L. The piston is integrally provided with a friction disc at a tip thereof projecting from the one of axles 41L and 41R, and presses the friction disc against the proximal end surface of the other axle 41R or 41L by the force of the spring, thereby engaging axles 41L and 41R with each other by a small friction force.

Axle 41L is axially divided into two parts between which a torque limiter TL is interposed. The two divisional parts are integrally rotatably joined to each other through a coupling 69. Torque limiter TL has alternately aligned friction discs engaged to axle 41L and friction discs engaged to inner ring 61 of two-way clutch BC. A disc spring 70 presses the friction discs against one another so as to reduce the drive torque of axle 41L to a certain degree before transmitting the torque to inner ring 61. Torque limiter TL prevents a high load from being applied onto rollers 62, thereby preventing rollers 62 from being wedged between inner ring 61 and respective cam surfaces 64b.

In FIG. 3, clutches CL and CR, two-way clutch BC, shift mechanism S and torque limiter TL are disposed on one of left and right sides of center gear 44 laterally eccentrically in auxiliary transaxle T2. If they have to be arranged in a well-balanced and compact layout, they may be alternatively disposed according to following other embodiment.

Referring to a second embodiment of auxiliary transaxle T2 shown in FIG. 5, description will be given of only points distinguished from the above first embodiment shown in FIGS. 3 and 4(a)-4(c). Description of members or portions, which are identical or similar to those in the first embodiment and are designated by the same reference numerals, is omitted unless any of them is to be specially mentioned.

In this auxiliary transaxle T2, ball-type clutches CL and CR and clutch slider 55 are disposed on one side of center gear 44. Two-way clutch BC and torque limiter TL are disposed on the other side of center gear 44. Shift mechanism S is disposed in center gear 44.

More specifically, a housing element 40e is attached to first housing element 40a so as to serve as a side wall enclosing a portion of axle 41R extended outward from bearing 50 journaling first support member 45 of center gear 44. Two-way clutch BC and torque limiter TL are disposed on axle 41R in housing element 40e.

Bearing 60 holding outer ring 64 of two-way clutch BC is disposed in housing element 40e, and cam 65 extended from outer ring 64 is inserted into first support element 45. A cover 71 is attached to an end of third support element 46 of center gear 44, and holds spring 59 pressed against one end of clutch slider 55 so as to bias clutch slider 55 to the clutch-on position. Cam 58 adapted to engaged with cam 65 is a member separated from clutch slider 55, and joined to the other end of clutch slider 55 via pins 72.

Figure 5:
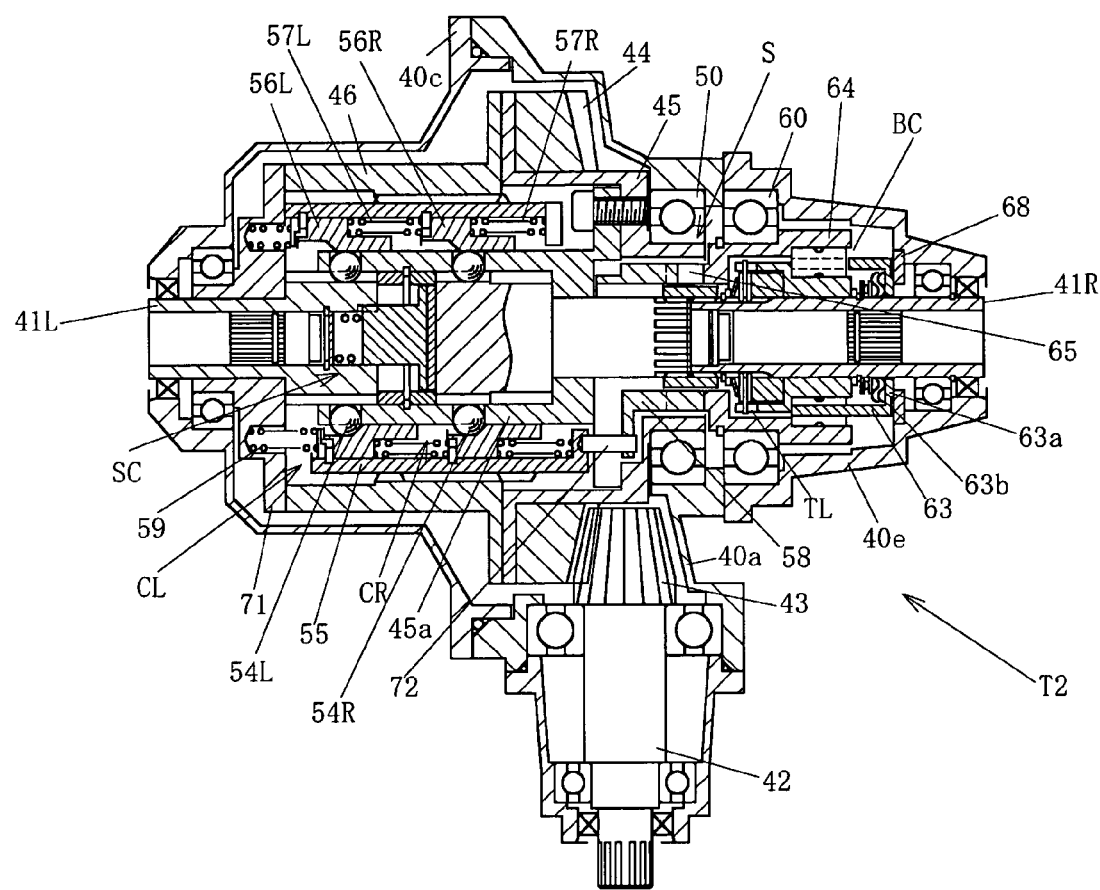
FIG. 5 is a sectional plan view of an auxiliary transaxle according to a second embodiment of the present invention.

In FIG. 5, an upper portion of clutch slider 55 above axles 41L and 41R is illustrated as being disposed at the clutch-off position where cams 58 and 65 are separated from each other, and a lower portion of clutch slider 55 below axles 41L and 41R is illustrated as being disposed at the clutch-on position where cams 58 and 65 engage with each other.

Referring to a third embodiment of auxiliary transaxle T2 shown in FIGS. 6 and 7, description will be given of only points distinguished from the above first embodiment shown in FIGS. 3, 4(a), 4(b) and 4(c). Description of members or portions, which are identical or similar to those in the first embodiment and are designated by the same reference numerals, is omitted unless any of them is to be specially mentioned.

The important point of the third embodiment distinguished from the first and second embodiments is that shift mechanism S for engaging and disengaging clutches CL and CR partly includes electric means while shift mechanisms S of the first and second embodiments are entirely mechanical. That is, shift mechanism S shown in FIG. 6 includes an electric switch SW for detecting existence of slipping main drive wheel S and an electronic actuator Ea for axially moving pressure members 56L and 56R according to switching of electric switch SW.

Axles 41L and 41R are disposed on the rotary axis of center gear 44 so as to face each other at proximal ends thereof. Transmission members 80L and 80R are fixed on the respective proximal ends of axles 41L and 41R, and formed on peripheral surfaces thereof with respective recesses 52L and 52R. Center gear 44 is integrally formed at an inner peripheral portion thereof with cylindrical shaft 45a extended in opposite axial directions from the space between the proximal ends of axles 41L and 41R, so that one portion of cylindrical shaft 45a around axle 41L covers transmission member 80L, and the other portion of cylindrical shaft 45a around axle 41R covers transmission member 80R. Cylindrical shaft 45a is formed with radial penetrating holes 53L corresponding to recesses 52L, and with radial penetrating holes 53R corresponding to recesses 52R. Each of balls 54L is disposed between recess 52L and corresponding hole 53L, and each of balls 54R is disposed between recess 52R and corresponding hole 53R.

Pressure members 56L and 56R are axially slidably fitted on the outer peripheral surface of cylindrical shaft 45a so as to be selectively set into a clutch-on state for pressing respective balls 54L and 54R into respective recesses 52L and 52R through respective holes 53L and 53R, or into a clutch-off state for allowing respective balls 54L and 54R to be removed from respective recesses 52L and 52R by centrifugal force.

A shift fork 81L is connected to pressure member 56L via spring 57L, and a shift fork 81R is connected to pressure member 56R via spring 57R. A fork shaft 82 penetrates both boss portions 81a of shift forks 81L and 81R so as to hang shift forks 81L and 81R therefrom. Each of boss portions 81a is formed with a cam slot 81b slanted from the axial direction of fork shaft 82. Fork shaft 82 is rotatably but not axially slidably supported by housing 40. A pair of pins 82a are engaged into respective cam slots 81b so as to project radially outward from the outer peripheral surface of respective boss portions 81a.

By rotating fork shaft 82, pins 82a move in respective cam slots 81b so as to move positions of shift forks 81L and 81R in the axial direction of fork shaft 82. In FIG. 6, upper portions of shift forks 81L and 81R above axles 41L and 41R are illustrated as being disposed at clutch-on positions, and lower portions of shift forks 81L and 81R below axles 41L and 41R are illustrated as being disposed at clutch-off positions.

A clutch operation arm 83 is fixed on an outer end of fork shaft 82 outside housing 40. A movable portion of push-and-pull type electronic actuator Ea is connected to a free tip end of clutch operation arm 83. When a controller (not shown) receives a signal indicating the switching-on of switch SW, the controller extends or contracts the movable portion of actuator Ea so as to rotate fork shaft 82 to a certain degree, thereby generating a thrust between each pin 82a and each cam slot 81b. Accordingly, shift forks 81L and 81R disposed at the clutch-on positions (as the upper portions thereof above axles 41L and 41R illustrated in FIG. 6) are simultaneously moved toward each other, i.e., moved to the clutch-off positions (as the lower portions thereof below axles 41L and 41R illustrated in FIG. 6), so as to elastically move pressure members 56L and 56R via springs 57L and 57R to the positions for pressing balls 54L and 54R into recesses 52L and 52R.

Housing 40 of this embodiment includes a main housing element 40f and a cover element 40g joined to main housing element 40f so as to cover a sideward opening of main housing element 40f. Cylindrical shaft 45a is journalled at one end portion thereof by main housing element 40f via a bearing, and at the other end portion thereof by side cover element 40g via a bearing. Cover element 40g is integrally formed with an expanded portion 40ga for journaling axle 41R. The end of cylindrical shaft 45a and a diametrically narrowed boss portion 80a of transmission member 80R are extended into expanded portion 40ga.

A structure in expanded portion 40ga of cover 40g will be detailed with reference to FIG. 7. Two-way clutch BC is disposed in expanded portion 40ga. In this regard, inner ring 61 is relatively rotatably disposed on boss portion 80a, however, connected to boss portion 80a via torque limiter TL. A thrust bearing and waved washer 67 are fitted on boss portion 80a adjacent to torque limiter TL so as to apply a certain braking force onto cage 63.

A holder 84 is fitted onto the outer peripheral surface of outer ring 64. A switch operation member 85 is spline-fitted onto the outer peripheral surface of holder 84 so as to be not relatively rotatable but axially slidable on holder 84. A sensing portion of switch SW is screwed into cover element 40g so as to face an axially distal end surface of switch operation member 85. On a proximal end portion of switch operation member 85 toward cylindrical shaft 45a is formed a cam 85a shaped to alternately align substantially triangular convexes and concaves along the periphery thereof. Cam 85a is adapted to engage with a cam 45b formed on the end of cylinder portion 45 disposed in expanded portion 40ga. A spring 86 is interposed between holder 84 and switch operation member 85 so as to bias cam 85a to deeply engage with cam 45b.

This two-way clutch BC functions in the same way as illustrated in FIGS. 4(a) to 4(c). In the state that torque limiter TL reduces torque of axle 41R to be transmitted to inner ring 61, two-way clutch BC is engaged when the rotary speed of outer ring 64 exceeds the rotary speed of inner ring 61 due to slip of main drive wheel 5. At this time, a thrust is generated between cams 85a and 45b so as to make switch operation member 85 push the sensing portion of switch SW, thereby actuating electronic actuator Ea for engaging clutches CL and CR as mentioned above.

Clutches CL and CR in this embodiment are operated by respective shift forks 81L and 81R, in comparison with clutches CL and CR in each of the first and second embodiments are operated by common clutch slider 55. Auxiliary transaxle T2 according to a fourth embodiment shown in FIG. 8 serves as auxiliary transaxle T2 of the third embodiment modified to have a pair of two-way clutches BCL and BCR by using shift forks 81L and 81R for operating respective clutches CL and CR.

Referring to the fourth embodiment of auxiliary transaxle T2 shown in FIG. 8, description will be given of only points distinguished from the third embodiment shown in FIGS. 6 and 7. Description of members or portions, which are identical or similar to those in the third embodiment and are designated by the same reference numerals, is omitted unless any of them is to be specially mentioned.

A pair of fork shafts 82L and 82R are supported by respective left and right side walls of housing 40. Shift forks 81L and 81R for operating respective ball-type clutches CL and CR are hung from respective fork shafts 82L and 82R by engaging pins 82a into cam slots 81b. Clutch operation arms 83L and 83R are fixed onto axially distal ends of respective fork shafts 82L and 82R outside housing 40. Movable portions of push-and-pull type electronic actuators EaL and EaR are connected to tip ends of respective clutch operation arms 83L and 83R.

Transmission members 80L and 80R fitted on respective axles 41L and 41R have respective diametrically narrowed boss portions 80aL and 80aR, which are extended distally in axial opposite directions so as to be provided thereon with respective two-way clutches BCL and BCR. Each of two-way clutches BCL and BCR has a holder fitted on the outer peripheral surface of outer ring 64. Switch operation members 85L and 85R are not relatively rotatably but axially slidably fitted onto the outer peripheral surfaces of the holders of two-way clutches BCL and BCR, respectively. Each of switch operation members 85L and 85R is formed with a cam at an axially proximal end thereof, and cylindrical shaft 45a is formed with cams at axially opposite ends thereof so as to engage the respective cams formed at the proximal ends of switch operation members 85L and 85R. Electric switches SWL and SWR are attached onto left and right side walls of housing 40 so as to have sensing portions facing axially distal ends of switch operation members 85L and 85R in housing 40, respectively.

Auxiliary transaxle T2 of this embodiment is advantageous in that, even when one of left and right auxiliary drive wheels 8 floats on the ground, the other auxiliary drive wheel 8 gripping the ground is effectively slowed down by slipping of main drive wheel 5 so as to engage corresponding two-way clutch BCL or BCR. Therefore, auxiliary transaxle T2 of the fourth embodiment requires no slip clutch SC for mutually connecting axles 41L and 41R by a small frictional force, thereby ensuring smooth rotation of auxiliary drive wheels 8 without frictional resistance therebetween during turning of the vehicle.

Referring to a fifth embodiment of auxiliary transaxle T2 shown in FIG. 9, description will be given of only points distinguished from the third embodiment shown in FIGS. 6 and 7. Description of members or portions, which are identical or similar to those in the third embodiment and are designated by the same reference numerals, is omitted unless any of them is to be specially mentioned.

Housing 40 includes upper and lower shell-like shaped housing elements 40' separably joined to each other through a horizontal plane including axes of left and right axles 41L and 41R and input shaft 42. Bearings 87a and 87b for journaling respective axles 41L and 41R are sandwiched between upper and lower housing members 40' at left and right end portions of housing 40. Bearings 48a and 48b for journaling input shaft 42, and bearings 50a and 50b for journaling opposite ends of cylindrical shaft 45a are also sandwiched between upper and lower housing members 40'. In this regard, each housing element 40' is formed with semicircular recesses into which half portions of bearings 87a, 87b, 48a, 48b, 50a and 50b are fitted, respectively.

In this way, auxiliary transaxle T2 of the fifth embodiment has such a simple housing structure, which is advantageous in facility of assembly and reduction of costs. Auxiliary transaxle T2 according to any of the first to fourth embodiments and a later-discussed sixth embodiment may alternatively employ this simple housing structure.

Housing 40 is formed therein with a partition wall holding bearing 50a, which partitions an inner space of housing 40 into a first chamber and a second chamber. Gears 43 and 44 and clutches CL and CR are disposed in the first chamber. A mechanism for detecting slip of main drive wheel 5, including two-way clutch BC, is disposed in the second chamber. Lube in housing 40 can flow between the first and second chambers.

Proximal portions of axles 41L and 41R are coaxially disposed in cylinder shaft 45a so as to face each other. Proximal portions of axles 41L and 41R in cylinder shaft 45a are diametrically expanded so as to serve as respective transmission members 80L and 80R. Each of clutches CL and CR is interposed between cylindrical shaft 45a and each of transmission members 80L and 80R. Description of mechanism of clutches CL and CR is omitted because it is similar to that of clutches CL and CR according to the third embodiment.

One end of cylindrical shaft 45a, formed with cam 45b, is extended distally from bearing 50a into the second chamber so as to engage with cam 85a fixed to one end surface of switch operation member 85. In the second chamber, two-way clutch BC is constructed so that inner ring 61 is fitted on axle 41L, and switch operation member 85 is spline-fitted on the outer peripheral surface of outer ring 64 so as to be not relatively rotatable but axially slidable on outer ring 64. Disc spring 86 is interposed between outer ring 64 and cam 85a so as to bias switch operation member 85 to a switch-off position. The other end of cylindrical shaft 85 faces the sensing portion of electric switch SW screwed into a side wall of the second chamber.

Vertical retaining plate 68 is disposed adjacent to the side wall of the second chamber. An opened cylindrical portion is extended from an outer peripheral edge of retaining plate 68 along the outer peripheral surface of outer ring 64 so as to guide outer ring 64. The cylindrical portion of retaining plate 68 is radially stepped at an axial intermediate position so as to not relatively rotatably fit to an inside surface of the side wall of the second chamber. Axle 41L is extended outward through retaining plate 68. A retaining ring is fixed on axle 41L adjacent to a vertical outside surface of retaining plate 68, and a thrust bearing is interposed on axle 41L between the retaining ring and the vertical outside surface of retaining plate 68.

A vertical side plate portion 63a of cage 63 is disposed in the cylindrical portion of retaining plate 68 adjacent to a vertical inside surface of retaining plate 68. A friction plate 63b is stuck to an outside surface of vertical side plate portion 63a facing to the vertical inside surface of retaining plate 68. Axle 41L penetrates the vertical side plate portion 63a and friction plate 63b. A retaining ring is fixed on axle 41L opposite to vertical retaining plate 68 with respect to vertical side plate portion 63a of cage 63. A thrust bearing and waved washer 67 are fitted on axle 41L between the retaining ring and vertical side plate portion 63a so as to press friction plate 63b against the vertical inside surface of retaining plate 68, thereby applying a certain braking force onto cage 63.

Torque limiter TL is interposed between inner ring 61 and axle 41L so as to reduce torque of axle 41L to be transmitted to inner ring 61. Torque limiter TL comprises alternately aligned friction plates fitted to inner ring 61 and friction plates fitted to axle 41L. Torque limiter TL further comprises a disc spring pressing the friction plates against one another by a certain biasing force.

Spring-load type slip clutch SC is interposed between axles 41L and 41R so as to constantly engage axles 41L and 41R to each other by a small frictional force. Slip clutch SC comprises alternately aligned friction plates fitted to axle 41L and friction plates fitted to axle 41R. Slip clutch SC further comprises a disc spring pressing the friction plates against one another by a certain biasing force.

Push-and-pull type electronic actuator Ea has a casing 88a screwed into a side wall of housing 40. Actuator Ea has an electric motor 88b attached onto a distal end of casing 88a outside housing 40. A accelerator 88c, which may include a planetary gear mechanism, is attached to electric motor 88b so as to accelerate output rotation of motor 88b, and a threaded shaft 88d serving as an output shaft of accelerator 88c is extended coaxially to fork shaft 82 and toward fork shaft 82. A nut 88e is screwed on threaded shaft 88d, and not relatively rotatably and not axially slidably engages to a piston 88f coaxially abutting against a distal end of fork shaft 82.

The output rotation of electric motor 88b is controlled by a controller (not shown), and accelerated by accelerator 88c so as to rotate threaded shaft 88*d* at high speed. By rotating threaded shaft 88*d*, nut 88*e* and piston 88*f* are axially moved along thread shaft 88*d* so as to axially move fork shaft 82 abutting against piston 88*f*. Piston 88*f* and fork shaft 82 illustrated in FIG. 9 are disposed at the farthest axial position from electric motor 88*b*.

In housing 40, shift fork 81L engaging with pressure member 56L of clutch CL and shift fork 81R engaging with pressure member 56R of clutch CR are axially slidably fitted on fork shaft 82 so as to be aligned left and right. Retaining rings 89*a*, 89*b* and 89*c* are fixed on fork shaft 82, so that retaining ring 89*a* is nearest to actuator Ea, and retaining ring 89*c* is farthest from actuator Ea. Shift fork 81L and spring 57L are disposed on fork shaft 82 between retaining rings 89*a* and 89*b*. Shift fork 81R and spring 57R are disposed on fork shaft 82 between retaining rings 89*b* and 89*c*. Therefore, shift forks 81L and 81R are biased to the clutch-on positions thereof by respective springs 57L and 57R.

Shift forks 81L and 81R are biased to the clutch-off positions thereof by compressed spring 59 wound on fork shaft 82 between retaining ring 89*c* and a side wall of housing 40 opposite to actuator Ea. When fork shaft 82 is free from the thrust force of piston 88*f*, spring 59 expands to push retaining ring 89*c* so as to push fork shaft 82 together with shift forks 81L and 81R toward actuator Ea, thereby returning shift forks 81L and 81R to the clutch-off positions and keeping fork shaft 82 in contact with piston 88*f*.

Auxiliary transaxle T2 of the fifth embodiment functions as follows: the rotation of center gear 44 receiving power taken off from main transaxle T1 for driving main drive wheels 5 is transmitted to outer ring 64 of two-way clutch BC via cylinder shaft 45*a*, cams 45*b* and 85*a* and switch operation member 85. On the contrary, the rotation of auxiliary drive wheels 8 is transmitted to inner ring 61 of two-way clutch BC.

Figure 4:
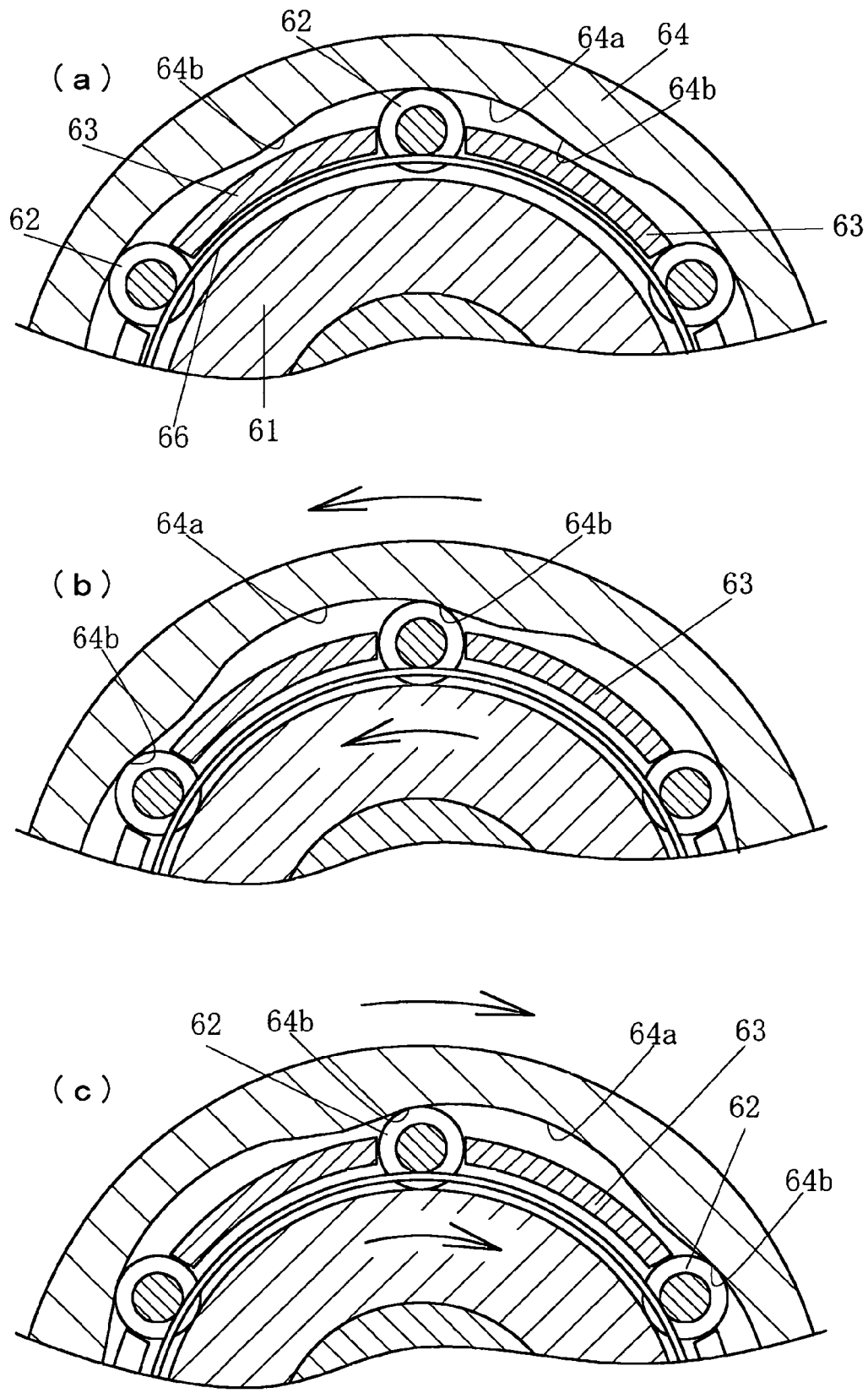
FIG. 4(a) is a sectional side view of a principal portion of the auxiliary transaxle, showing a state of a two-way clutch when the vehicle is stationary.
FIG. 4(b) is a sectional side view of the principal portion of the auxiliary transaxle, shown a state of the two-way clutch when the vehicle travels forward.
FIG. 4(c) is a sectional side view of the principal portion of the auxiliary transaxle, shown a state of the two-way clutch when the vehicle travels backward.

Two-way clutch BC functions in the same way as shown in FIGS. 4(*a*) to 4(*c*). In this regard, if the vehicle traveling in a two-wheel drive mode by driving only main drive wheels 5 (without driving of auxiliary drive wheels 8) has main drive wheel 5 slip, a thrust is generated between cams 45*b* and 85*a* so as to move switch operation member 85 to switch on electric switch SW. Therefore, motor 88*b* is driven to move fork shaft 82 (rightward in FIG. 9) against spring 59 so as to simultaneously move shift forks 81L and 81R and pressure members 56L and 56R to the clutch-on positions via springs 57L and 57R, thereby engaging clutches CL and CR. Consequently, auxiliary drive wheels 8 automatically start to be driven, i.e., the vehicle comes to travel in a four-wheel drive mode.

If main drive wheel 5 having slipped escapes from slipping, the thrust caused between cams 85*a* and 45*b* for thrusting switch operation member 85 is canceled so that switch operation member 85 is returned by the biasing force of spring 86 so as to switch off electric switch SW. Therefore, motor 88*b* is stopped, and fork shaft 82 moves (leftward in FIG. 9) by the force of spring 59 until retaining ring 89*a* abuts against an inside surface of the side wall of housing 40. Simultaneously, spring 59 pushes retaining ring 89*c* to move shift forks 81L and 81R and pressure members 56L and 56R to the clutch-off positions, thereby disengaging clutches CL and CR. Consequently, the driving of auxiliary drive wheels 8 is automatically canceled so that the vehicle comes to travel in the two-wheel drive mode.

Referring to a sixth embodiment of auxiliary transaxle T2 shown in FIG. 10, description will be given of only points distinguished from the fifth embodiment shown in FIG. 9. Description of members or portions, which are identical or similar to those in the fifth embodiment and are designated by the same reference numerals, is omitted unless any of them is to be specially mentioned.

Figure 6:
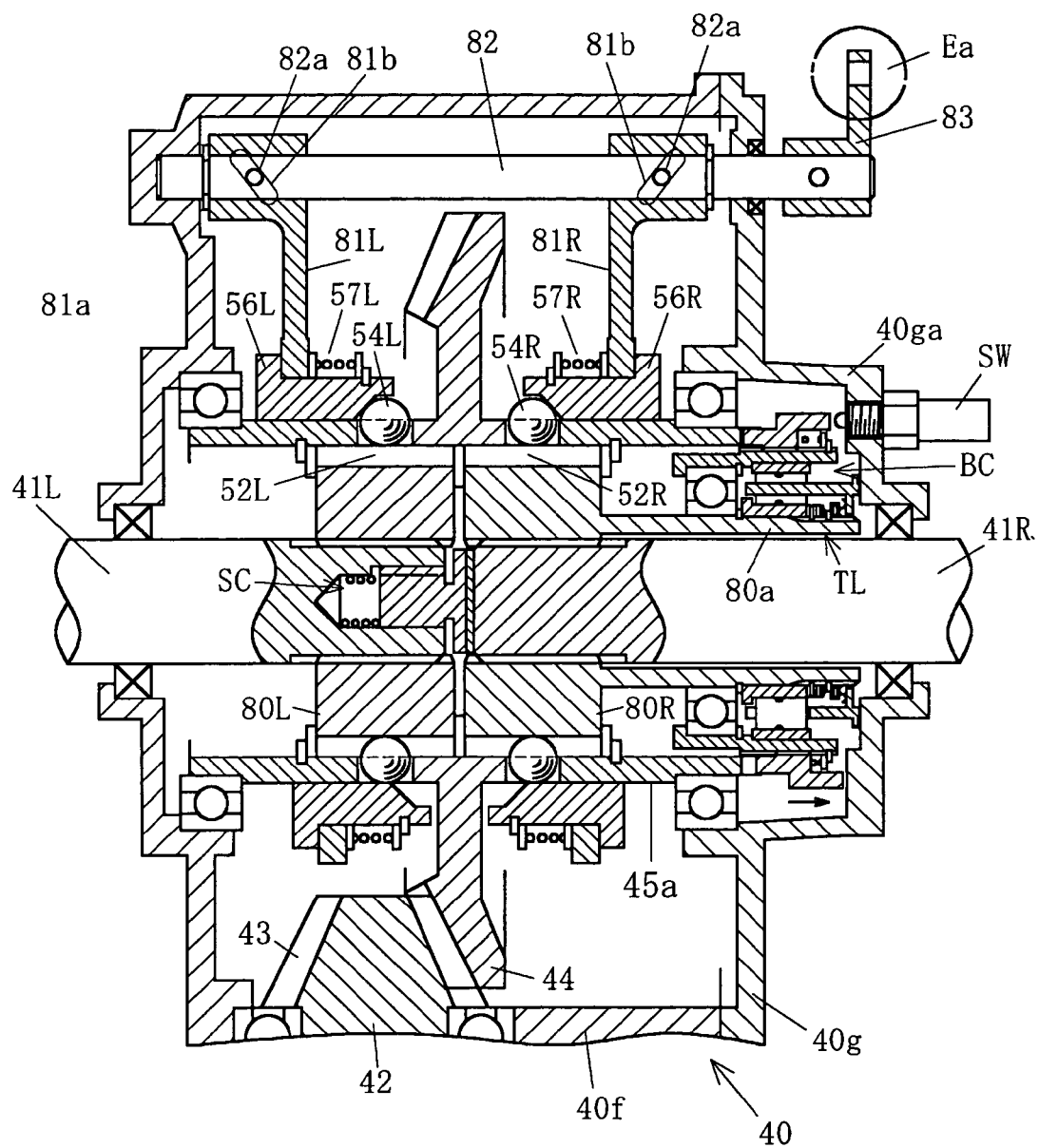
FIG. 6 is a sectional plan view of an auxiliary transaxle according to a third embodiment of the present invention.
Figure 7:
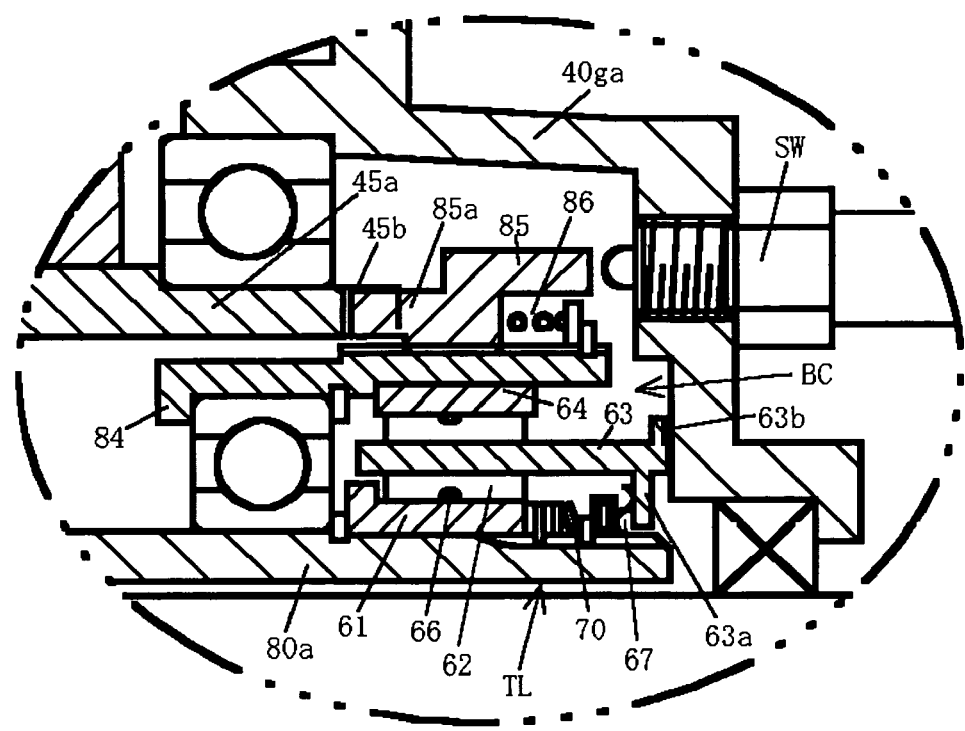
FIG. 7 is an enlarged fragmentary sectional plan view of the auxiliary transaxle according to the third embodiment.
Figure 9:
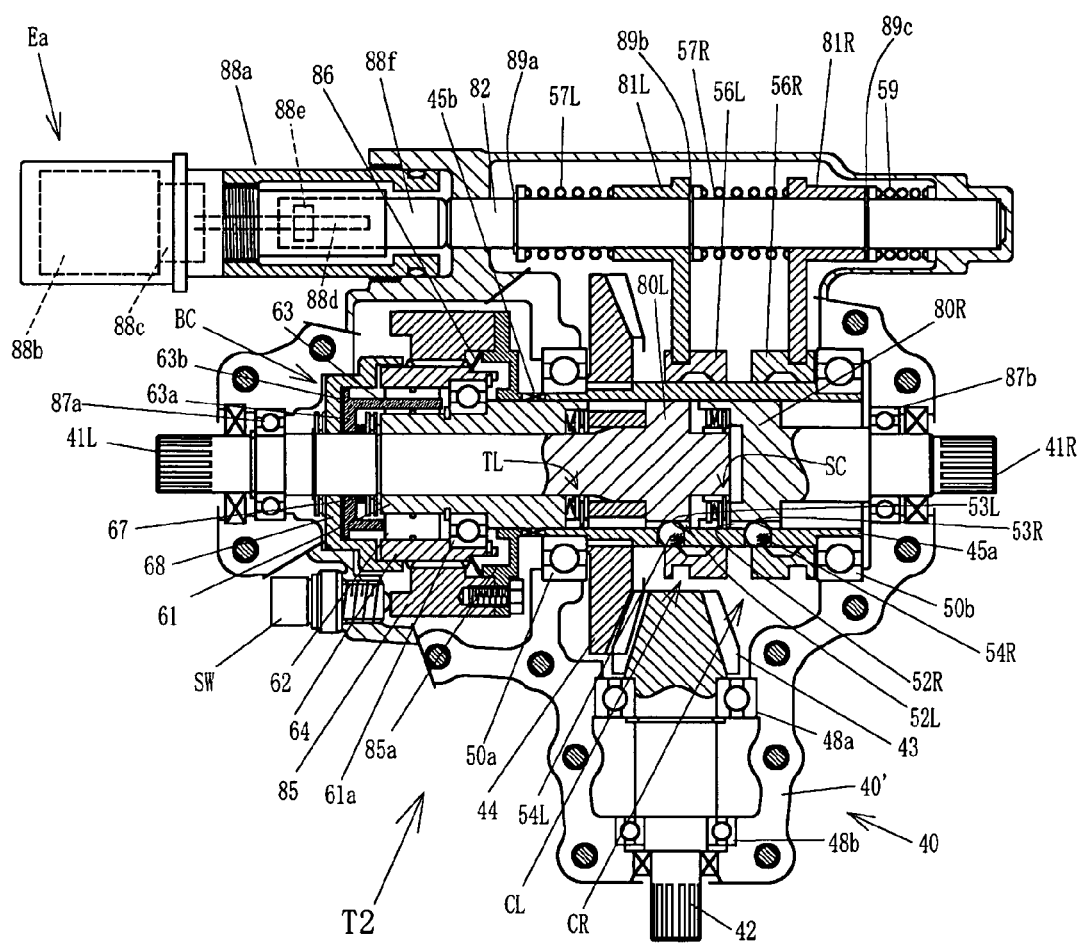
FIG. 9 is a sectional plan view of an auxiliary transaxle according to a fifth embodiment of the present invention.

Each of the third embodiment of auxiliary transaxle T2 shown in FIG. 6 and the fifth embodiment of auxiliary transaxle T2 shown in FIG. 9 comprises shift mechanism S including electronic actuator Ea, and electronic actuator Ea is controlled by use of means for detecting existence of slipping of main drive wheel 5 (judging means for judging whether or not main drive wheel 5 slips), including two-way clutch BC, switch operation member 85 with the cam, and electric switch SW. On the other hand, in the present embodiment of auxiliary transaxle T2 shown in FIG. 10, the means for detecting existence of slipping of main drive wheel 5, which is used for controlling actuator Ea of shift mechanism S, comprises shift mechanism S including a gear speed sensor 91 for detecting the speed of rotation transmitted from main transaxle T1, an axle speed sensor 93 for the speed of rotation transmitted from auxiliary drive wheels 8, and a controller C. Controller C compares the detection values from sensors 91 and 93 with each other, and judges whether or not main drive wheel 5 slips. Further, auxiliary transaxle T2 shown in FIG. 10 is provided with a sensitivity adjusting dial 94 for adjusting a threshold value for judging whether or not main drive wheel 5 slips.

Since auxiliary transaxle T2 of the present embodiment includes no two-way clutch, an end portion of cylindrical shaft 45*a* supporting center gear 44 does not have to be provided for sensing engaging or disengaging of the two-way clutch, thereby reducing a space in housing 40 for the sensor for detecting the condition of the two-way clutch. Consequently, auxiliary transaxle T2 can be compacted.

Axle speed sensor 91 is an electromagnetic rotary speed sensor for picking up rotary speed of center gear 44 (Nin) is screwed into a side wall of housing (cover) element 40*g*. A rotary plate 90 is stuck to a back surface of center gear 44. Rotary plate 90 is formed with a circular portion 90*a* having convexes and concaves alternately aligned in a circle on the surface thereof at regular intervals. A sensing portion of rotary sensor 91 faces a part of circular portion 90*a*.

Axle speed sensor 93 is an electromagnetic rotary speed sensor for picking up rotary speed of axle 41L (Nout) is screwed into a side wall of housing (cover) element 40*g*. Axle 41L is formed on the outer peripheral surface thereof with a splined portion 92 having convexes and concaves alternately aligned therealong at regular intervals. A sensing portion of rotary sensor 93 faces a part of splined portion 92.

Gear speed sensor 91 may be replaced with a speedometer of the vehicle, or with a rotary speed sensor for detecting rotary speed of an axle of main drive wheel 5, which is made similarly to axle speed sensor 93 for detecting rotary speed of axle 41L. However, auxiliary transaxle T2 shown in FIG. 10 integrally provided with both rotary speed sensors 91 and 93 is advantageous in quality control.

A gear ratio of center gear 44 to bevel pinion 43 in auxiliary transaxle T2 is set to be larger than a gear ratio of the final gear of differential gear unit 25 to counter shaft 22 and axles 24L and 24R in main transaxle T1 (see FIG. 1) so that rotary speed Nout of axle 41L exceeds rotary speed Nin of center gear 44 on the input side of auxiliary transaxle T2 even if steerable auxiliary drive wheel 8 drivingly connected to axle 41L is disposed on the inside of the vehicle and slowed down during turning of the vehicle.

Figure 11:
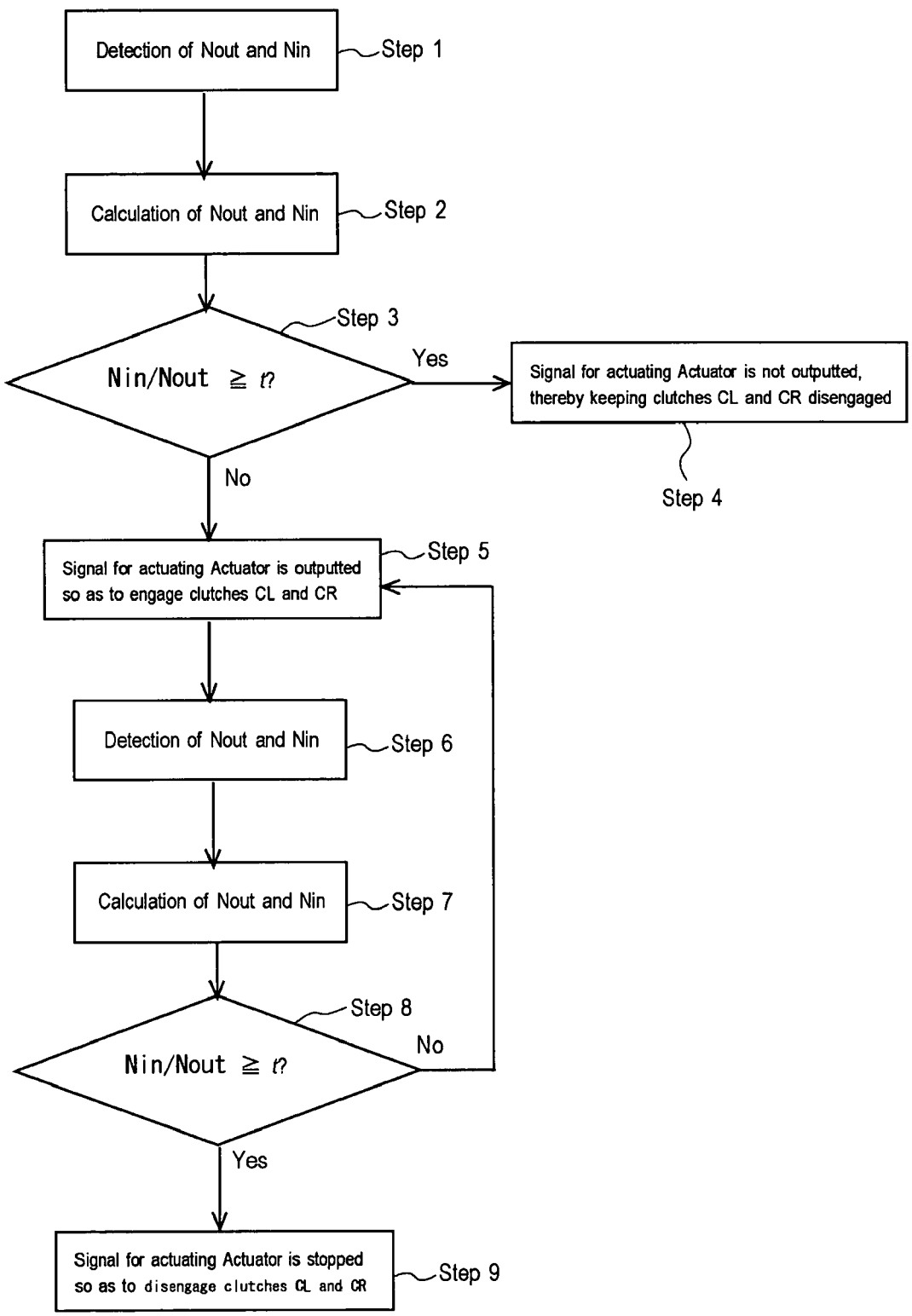
FIG. 11 is a flow chart of controlling the auxiliary transaxle according to the sixth embodiment.

Control of electronic actuator Ea by controller C will be detailed with reference to a flow chart of FIG. 11. Detection signals about from respective rotary speed sensors 91 and 93 are inputted to controller C. Based on the inputted signals, controller C calculates input rotary speed Nin of center gear 44 synchronized to rotary of main drive wheel 5 and rotary speed Nout of axle 41L, i.e., of left auxiliary drive wheel 8 (at a step 1 of the flow chart). Controller C calculates a rotary speed ratio Nin/Nout, i.e., a ratio of rotary speed Nin to rotary speed Nout (at a step 2 of the flow chart). Controller C compares the calculated ratio with a threshold t (at a step 3 of the flow chart) so as to judge whether or not main drive wheel 5 slips. For instance, threshold t for the step 3 is set to be 0.8, as shown in FIG. 11.

If the calculated rotary speed ratio (Nin/Nout) exceeds or is equal to threshold t during two-wheel drive traveling of the vehicle by driving only main drive wheels 5, controller C judges that main drive wheels 5 do not slip. Then, controller C does not output a signal for actuating electronic actuator Ea (at a step 4 of the flow chart).

If the calculated rotary speed ratio (Nin/Nout) is less than threshold t, controller C judges that any of main drive wheels 5 slips. Then, controller C outputs a signal for actuating electronic actuator Ea so as to drive auxiliary drive wheels 8 simultaneously to driving of main drive wheels 5, thereby putting the vehicle into the four-wheel drive mode (at a step 5 of the flow chart).

Afterward, the detection of rotary speeds Nin and Nout (at a step 6 of the flow chart), the calculation of the rotary speed ratio (Nin/Nout) (at a step 7 of the flow chart) and the comparison of the calculated rotary speed ratio (Nin/Nout) with threshold t (at a step 8 of the flow chart) are repeated. While a renewed rotary speed ratio (Nin/Nout) is less than the threshold value, controller C maintains to output the signal for actuating electronic actuator Ea (at the step 5 of the flow chart) so as to keep the vehicle in the four-wheel drive mode. If a renewed rotary speed ratio (Nin/Nout) exceeds or is equal to the threshold value during the four-wheel drive traveling of the vehicle, controller C judges main drive wheel 5 escapes from slipping. Then, controller C stops the output of the signal for actuating electronic actuator Ea (at a step 9 of the flow chart) so as to return the vehicle into the two-wheel drive mode.

Figure 10:
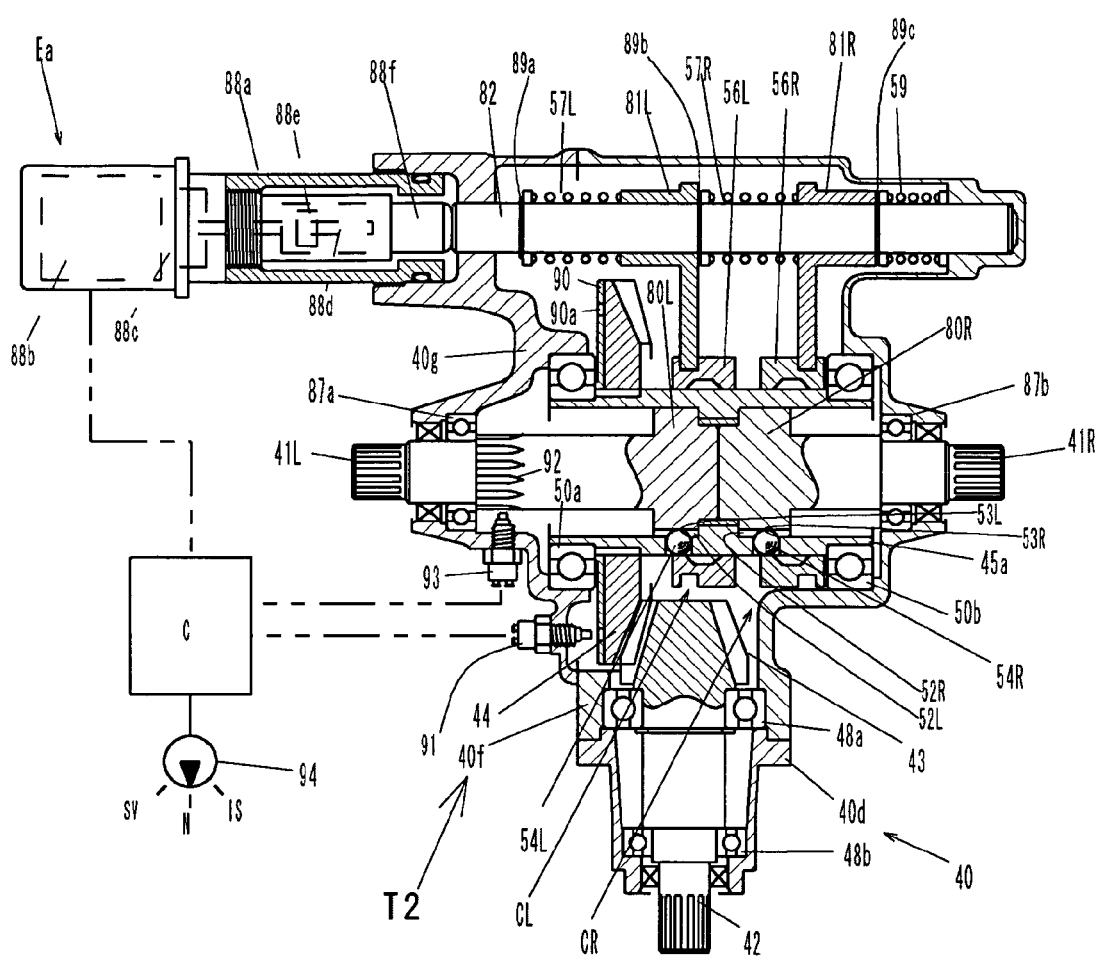
FIG. 10 is a sectional plan view of an auxiliary transaxle according to a sixth embodiment of the present invention.

Threshold t can be manually adjusted by rotating dial 94 shown in FIG. 10. Dial 94 is disposed adjacent to driver's seat 2 of the vehicle, e.g., on an instrument panel. Dial 94 can be switched among a normal position N for setting threshold t to be a standard value, a sensitive position SV for setting threshold t to be larger than the standard value, and an insensitive IS for setting threshold t to be smaller than the standard value.

The setting of dial 94 to sensitive position SV suits for strongly traveling over a damp ground, because the vehicle can be put into the four-wheel drive mode in high sensitive response to slipping of main drive wheel 5. The setting of dial 94 to insensitive position IS suits for softly traveling on a turf to be strictly prevented from being damaged, because the vehicle can travel in the two-wheel drive mode unless the degree of slipping of main drive wheel 5 becomes considerably large.

Alternatively, the gear ratio of center gear 44 to bevel pinion 43 in auxiliary transaxle T2 may be set to be equal to the gear ratio of the final gear of differential gear unit 25 to counter shaft 22 in main transaxle T1. In this case, threshold t should be smaller than the value set in the above-mentioned case where the gear ratio of center gear 44 to bevel pinion 43 in auxiliary transaxle T2 is larger than the gear ratio of the final gear of differential gear unit 25 to counter shaft 22 in main transaxle T1. Threshold t in this case may be 0.7, for instance.

Figure 12:
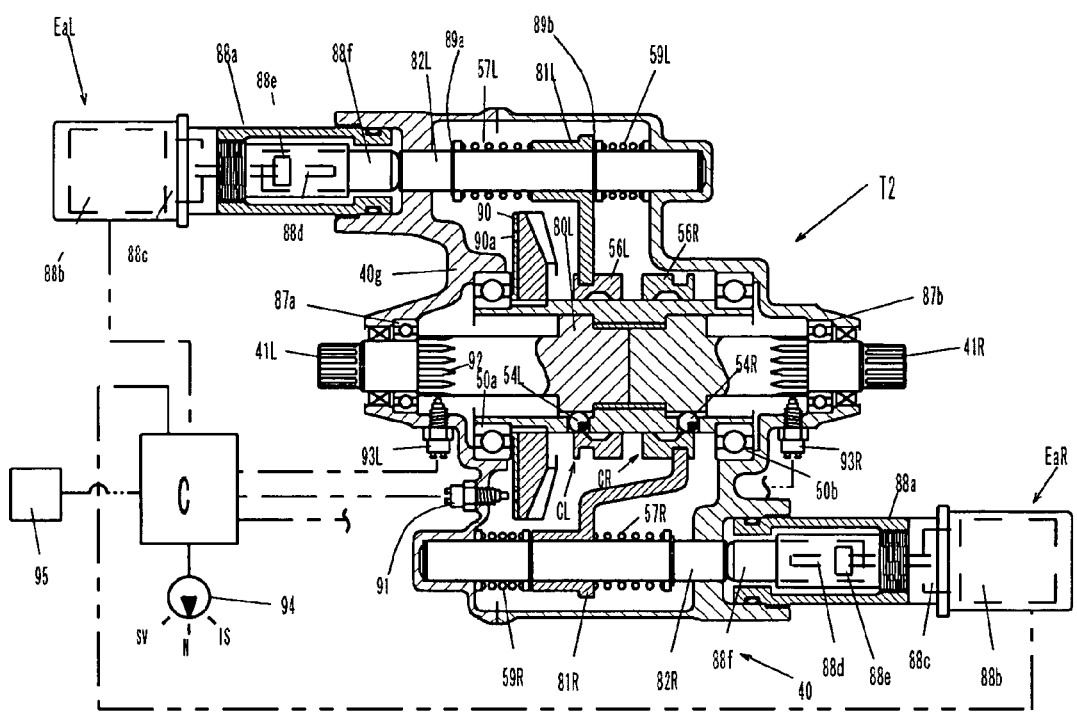
FIG. 12 is a developed sectional plan view of an auxiliary transaxle according to a seventh embodiment of the present invention.

Referring to a seventh embodiment of auxiliary transaxle T2 shown in FIG. 12, description will be given of only points distinguished from the sixth embodiment shown in FIGS. 10 and 11. Description of members or portions, which are identical or similar to those in the sixth embodiment and are designated by the same reference numerals, is omitted unless any of them is to be specially mentioned. Further, in FIG. 12, mutually meshing bevel pinion 43 and input shaft 42, which really exist in the present auxiliary transaxle T2, are not illustrated because FIG. 12 is a developed sectional view of auxiliary transaxle T2 for illustrating both electronic actuators EaL and EaR with axles 41L and 41R therebetween.

Figure 8:
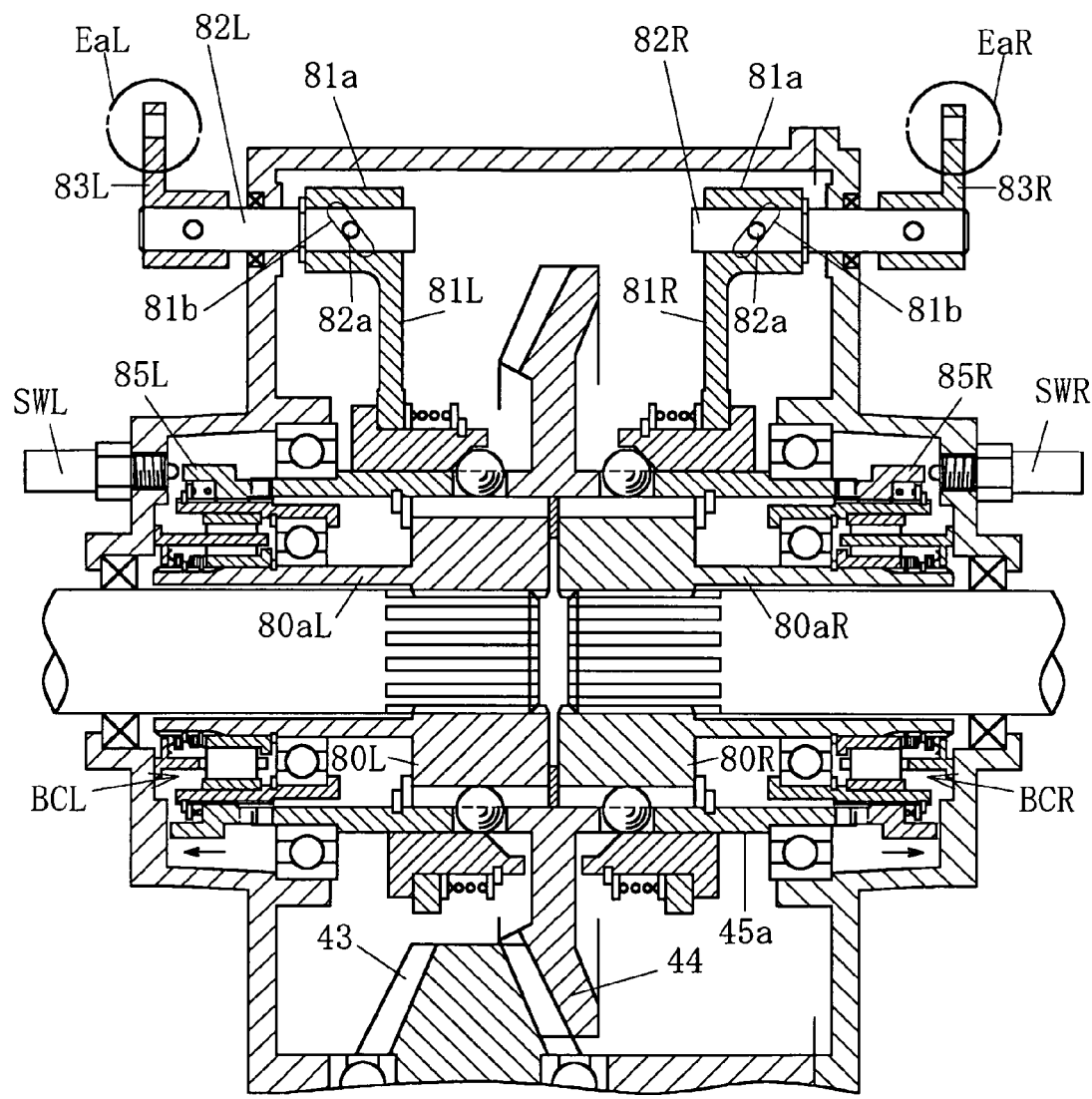
FIG. 8 is a sectional plan view of an auxiliary transaxle according to a fourth embodiment of the present invention.

Similar to the fourth embodiment shown in FIG. 8, the present auxiliary transaxle T2 is provided with electronic actuators EaL and EaR for shifting respective ball-type clutches CL and CR. Means of the present auxiliary transaxle T2 for detecting the slipping of main drive wheel 5 comprises gear speed sensor 91 for detecting rotary speed of center gear 44 to be inputted to auxiliary drive wheels 8, axle speed sensors 93L and 93R for detecting respective rotary speeds of left and right axles 41L and 41R, i.e., of left and right auxiliary drive wheels 8, a steering angle sensor 95, and controller C for receiving signals from sensors 91, 93L, 93R and 95 and controlling electronic actuators EaL and EaR, in comparison with the means of the fourth embodiment of auxiliary transaxle T2 for detecting the slipping of main drive wheel 5 comprising two-way clutches BCL and BCR. Therefore, the present transaxle T2 can be compacted because axles 41L and 41R in housing 40 have no two-way clutch thereon.

The present auxiliary transaxle T2 can shift respective clutches CL and CR individually, due to respective actuators EaL and EaR. Controller C for the present auxiliary transaxle T2 controls electronic actuators EaL and EaR for solving the slipping of main drive wheel 5 during turning of the vehicle in the following way.

During traveling of the vehicle in two-wheel drive mode by driving only main drive wheels 5, steering angle sensor 95 detects a turning angle of steerable auxiliary drive wheel (wheels) 8 or a turning angle of steering wheel 11. Controller C calculates a theoretical rotary speed ratio R of center gear 44 rotated synchronously with main drive wheels 5 to axles 41L and 41R of auxiliary drive wheels 8 in correspondence to the turning angle of the vehicle detected by steering angle sensor 95, thereby providing a threshold to be compared with a later-discussed calculated rotary speed ratio. Simultaneously, axle speed sensor 93L detects rotary speed NoutL of left axle 41L, axle speed sensor 93R detects rotary speed NoutR of right axle 41R, and rotary speed sensor 91 detects input rotary speed Nin of center gear 44 rotated to be inputted to axles 41L and 41R. Controller C calculates an average of rotary speeds of axles 41L and 41R ((NoutL+NoutR)/2), and calculates a rotary speed ratio, i.e., a ratio of input rotary speed Nin to the average.

Controller C compares the rotary speed ratio calculated based on sensors 91, 93L and 93R with rotary speed ratio R calculated based on sensor 95. If the rotary speed ratio calculated based on sensors 91, 93L and 93R is less than rotary speed ratio R calculated based on sensor 95, controller C judges that main drive wheel 5 slips. Controller C outputs a signal for actuating one of electronic actuators EaL and EaR, so as to engage one of clutches CL and CR for driving auxiliary drive wheel 8 disposed on the inside of the turning vehicle, thereby putting the vehicle into a three-wheel drive mode by driving one auxiliary drive wheel 8 and two main drive wheels 5. Consequently, the vehicle can increase traction capacity while keeping smooth steering capacity.

Afterward, the detection using sensors 91, 93L, 93R and 95 is repeated and controller C repeats the comparison of the two calculated rotary speed ratios. If the rotary speed ratio calculated based on sensors 91, 93L and 93R exceeds rotary speed ratio R calculated based on sensor 95, controller C judges that main drive wheel 5 escapes from slipping, and stops the output of signal for actuating actuator EaL or EaR having being actuated, thereby disengaging corresponding clutch CL or CR. Therefore, the vehicle returns to the two-wheel drive mode.

If the rotary speed ratio calculated based on sensors 91, 93L and 93R is still less than rotary speed ratio R calculated based on sensor 95, controller C judges that the traction capacity of the vehicle is still insufficient. Then, controller C outputs signals for actuating both electronic actuators EaL and EaR, so as to engage clutches CL and CR for driving auxiliary drive wheels 8 disposed on the inside and outside of the turning vehicle, thereby putting the vehicle into a four-wheel drive mode by driving two auxiliary drive wheel 8 and two main drive wheels 5. In this case, differential rotation of auxiliary drive wheels 8 is temporarily canceled so as to reduce the smooth steering capacity of the vehicle, and to thereby stop the vehicle in the worst case. However, escape of the vehicle from slipping in a bad road condition is preferred to the stopping of the vehicle.

Alternatively, controller C for controlling electronic actuators EaL and EaR may individually compare respective detected rotary speeds of axles 41L and 41R with the respective theoretical rotary speeds thereof during turning of the vehicle. If either (or both) of detected rotary speeds is less than the theoretical value, controller C actuates corresponding electronic actuator EaL or EaR (or actuators EaL and EaR) so that the rotary speed of corresponding axle 41L or 41R (or axles 41L and 41R) increases to approach the theoretical value (or values).

In each of the first to seventh embodiments of auxiliary transaxle T2, clutches CL and CR may alternatively be dog clutches or friction disc clutches. However, ball-type clutches CL and CR are preferable because they can surely transmit torque, they can be easily disengaged even if they have be firmly engaged, the number of component parts are small so as to reduce costs, and for other reasons.

As mentioned above, the utility vehicle shown in FIGS. 1 and 2 is an example of vehicles which can be equipped with any of the above-mentioned auxiliary transaxles T2. The auxiliary transaxles T2 may be adapted to various multi-wheel drive vehicles having main drive wheels and auxiliary drive wheels disposed before and behind, such as a six-wheel drive vehicle or a four-wheel drive vehicle, and to various vehicle types such as vehicles for traveling on irregular ground, including an ATV (All Terrain Vehicle).

It is further understood by those skilled in the art that the foregoing description is a preferred embodiment of the disclosed apparatus and that various changes and modifications may be made in the invention without departing from the scope thereof.

What is claimed is:

1. A transaxle for auxiliary drive wheels of a vehicle having a main drive wheel and left and right auxiliary drive wheels, comprising:
    a gear to which a rotary force for driving the main drive wheel is distributed;
    a pair of left and right axles drivingly connected to the respective left and right auxiliary drive wheels;
    a pair of clutches, wherein one of the clutches is interposed between the gear and the left axle, and the other clutch is interposed between the gear and the right axle;
    judging means for judging whether or not the main drive wheel slips; and
    a shift mechanism for engaging and disengaging the pair of clutches, wherein the shift mechanism simultaneously engages the pair of clutches when the judging means judges that the main drive wheel slips, and wherein the shift mechanism simultaneously disengages the pair of clutches when the judging means judges that the main drive wheel does not slip,
    the pair of clutches comprising:
        a cylindrical shaft disposed around the pair of axles so as to be rotatable integrally with the gear;
        respective balls radially movably disposed through the cylindrical shaft, wherein the pair of axles are formed on outer peripheral surfaces thereof with respective recesses into which the respective balls can be engaged; and
        respective pressure members disposed on an outer peripheral surface of the cylindrical shaft so as to be shifted between a state of pressing the respective balls into the respective recesses through the cylindrical shaft and a state of allowing the respective balls to be removed from the respective recesses through the cylindrical shaft.

2. The transaxle according to claim 1, wherein the judging means compares rotary speed of at least one of the axles with rotary speed of the gear, wherein the judging means judges that the main drive wheel slips when rotary speed of the gear exceeds rotary speed of the at least one of the axles, and wherein the judging means judges that the main drive wheel does not slip unless rotary speed of the main drive wheel exceeds rotary speed of the at least one of the axles.

3. The transaxle according to claim 2, wherein a gear ratio for driving the gear is set so that, while the pair of clutches are engaged, peripheral speed of the main drive wheel constantly exceeds peripheral speeds of the auxiliary drive wheels.

4. The transaxle according to claim 1, wherein the judging means compares rotary speed ratio of the gear to at least one of the axles with a threshold, wherein the judging means judges that the main drive wheel slips when the rotary speed ratio is lower than the threshold, and wherein the judging means judges that the main drive wheel does not slip unless the rotary speed ratio is lower than the threshold.

5. The transaxle according to claim 1, wherein the judging means compares a rotary speed ratio of the gear to an average rotary speed of the axles with a threshold, wherein the judging means judges that the main drive wheel slips when the rotary speed ratio is lower than the threshold, and wherein the judging means judges that the main drive wheel does not slip unless the rotary speed ratio is lower than the threshold.

6. The transaxle according to claim 1, further comprising:
    a housing incorporating the gear, the pair of axles, and the pair of clutches, wherein the shift mechanism comprises:
        a push-and-pull type actuator for shifting the pair of clutches; and
        an operation member engaging with the pair of clutches, wherein the push-and-pull type actuator is fixed to the housing so as to have a movable portion abutting against the operation member.

7. The transaxle according to claim 1, wherein the shift mechanism comprises an actuator for engaging and disengaging the pair of clutches, and wherein the judging means comprising: a gear speed sensor for detecting rotary speed of the gear; an axle speed sensor for detecting rotary speed of one of axles; and a controller for receiving signals from both of the sensors and for controlling the actuator.

8. The transaxle according to claim 7, wherein the controller compares a rotary speed ratio of the gear to the one of the axles with a threshold, wherein the controller controls the actuator so as to engage the pair of clutches when the rotary speed ratio is lower than the threshold, and wherein the controller controls the actuator so as to disengage the pair of clutches unless the rotary speed ratio is lower than the threshold.

9. The transaxle according to claim 7, further comprising:
a housing incorporating the gear, the pair of axles, and the pair of clutches, wherein the shift mechanism comprises:
a push-and-pull type actuator for shifting the pair of clutches; and
an operation member engaging with the pair of clutches, wherein the push-and-pull type actuator is fixed to the housing so as to have a movable portion abutting against the operation member.

10. The transaxle according to claim 1, wherein the shift mechanism comprises an actuator for engaging and disengaging the pair of clutches, and wherein the judging means comprising: a gear speed sensor for detecting rotary speed of the gear; first and second axle speed sensors for detecting respective rotary speeds of the axles; and a controller for receiving signals from the three sensors and for controlling the actuator.

11. The transaxle according to claim 10, wherein the controller compares a rotary speed ratio of the gear to an average rotary speed of the axles with a threshold, wherein the controller controls the actuator so as to engage the pair of clutches when the rotary speed ratio is lower than the threshold, and wherein the controller controls the actuator so as to disengage the pair of clutches unless the rotary speed ratio is lower than the threshold.

12. The transaxle according to claim 10, further comprising:
a housing incorporating the gear, the pair of axles, and the pair of clutches, wherein the shift mechanism comprises:
a push-and-pull type actuator for shifting the pair of clutches; and
an operation member engaging with the pair of clutches, wherein the push-and-pull type actuator is fixed to the housing so as to have a movable portion abutting against the operation member.

13. A transaxle for auxiliary drive wheels of a vehicle having a main drive wheel and left and right auxiliary drive wheels, comprising:
a gear to which a rotary force for driving the main drive wheel is distributed;
a pair of left and right axles drivingly connected to the respective left and right auxiliary drive wheels:
a pair of clutches, wherein one of the clutches is interposed between the gear and the left axle, and the other clutch is interposed between the gear and the right axle;
judging means for judging whether or not the main drive wheel slips; and
a shift mechanism for engaging and disengaging the pair of clutches, wherein the shift mechanism simultaneously engages the pair of clutches when the judging means judges that the main drive wheel slips, and wherein the shift mechanism simultaneously disengages the pair of clutches when the judging means judges that the main drive wheel does not slip,
the judging means comprising:
a two-way clutch interposed between the gear and the pair of axles, wherein, when rotary speed of the gear exceeds rotary speed of at least one of the pair of axles, the two-way clutch is engaged, and the shift mechanism engages the pair of clutches by the engaging of the two-way clutch, and wherein, while rotary speed of the gear is smaller than rotary speeds of the pair of axles, the two-way clutch is disengaged, and the shift mechanism disengages the pair of clutches by the disengaging of the two-way clutch.

14. The transaxle according to claim 13, wherein a gear ratio for driving the gear is set so that, while the pair of clutches are engaged, peripheral speed of the main drive wheel constantly exceeds peripheral speeds of the auxiliary drive wheels.

15. The transaxle according to claim 13, further comprising:
a torque limiter interposed between the two-way clutch and the pair of axles, or between the gear and the two-way clutch.

16. The transaxle according to claim 13, the pair of clutches comprising:
a cylindrical shaft disposed around the pair of axles so as to be rotatable integrally with the gear;
respective balls radially movably disposed through the cylindrical shaft, wherein the pair of axles are formed on outer peripheral surfaces thereof with respective recesses into which the respective balls can be engaged; and
respective pressure members disposed on an outer peripheral surface of the cylindrical shaft so as to be shifted between a state of pressing the respective balls into the respective recesses through the cylindrical shaft and a state of allowing the respective balls to be removed from the respective recesses through the cylindrical shaft.

17. The transaxle according to claim 13, the shift mechanism comprising:
a switch sensing either engaging or disengaging of the two-way clutch; and
an actuator for shifting the pair of clutches, controlled according to a state of the switch.

18. The transaxle according to claim 17, further comprising:
a housing incorporating the gear, the pair of axles, the pair of clutches, and the two-way clutch, wherein the actuator is a push-and-pull type actuator, and the shift mechanism further comprises:
an operation member engaging with the pair of clutches, wherein the push-and-pull type actuator is fixed to the housing so as to have a movable portion abutting against the operation member.

* * * * *